United States Patent Office 3,506,434
Patented Apr. 14, 1970

3,506,434
AGENTS FOR COMBATING UNDESIRABLE PLANT GROWTH
Ernst Jacobi, Dietrich Erdmann, Gunther Mohr, Sigmund Lust, and Gerhart Schneider, Darmstadt, and Konrad Niethammer, Traisa, Germany, assignors to E. Merck AG, Darmstadt, Germany
No Drawing. Continuation-in-part of application Ser. No. 310,118, Sept. 19, 1963. This application June 14, 1968, Ser. No. 736,954
Claims priority, application Germany, Sept. 22, 1962, M 54,289
Int. Cl. A01n 9/12, 9/22, 9/24
U.S. Cl. 71—89   45 Claims

ABSTRACT OF THE DISCLOSURE

For controlling undesirable plant growth, a composition comprising at least one fluorene derivative, e.g., n-butyl-9-fluorenol-9-carboxylate in synergistic combination with a herbicide or plant growth regulator, e.g., 2-ethylhexyl-(2-methyl-4-chloro-phenoxy)-acetate.

---

This application is a continuation-in-part of application Ser. No. 310,118, filed Sept. 19, 1963, now abandoned.

This invention relates to methods and compositions for controlling undesirable plant growth.

The object of this invention is to provide compositions controlling undesirable plant growth.

Another object is to provide a method of controlling undesirable plant growth.

Upon further study of the specification and claims other objects and advantages of the present invention will become apparent.

To attain these objects, it has been found that fluorene-9-carboxylic acid, its salts and esters as well as a number of substituted derivatives thereof in combination with known herbicidal and/or other conventional growth-regulating substances form synergistic compositions which are particularly suitable for controlling undesirable plant growth.

The fluorene-9-carboxylic acid and its derivatives to be used according to this invention are compounds of Formula I

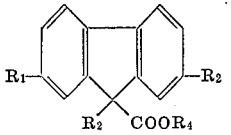

wherein $R_1$ and $R_2$ are the same or different, and are each any of hydrogen or halogen (i.e. fluorine, chlorine, bromine or iodine);
$R_3$ represents any of hydrogen, chlorine, hydroxy, alkoxy of up to 4 carbon atoms or acetoxy;
$R_4$ represents any of hydrogen, alkyl of up to 12 carbon atoms, or one equivalent of a salt-forming cation.

Preferred salt forming cations for the fluorene carboxylic acids of this invention are, for example, alkali metal cations such as Na+ and K+ as well as earth alkali metal cations such as CA++ and Mg++ or other salt forming cations customarily used in pesticides such as Zn++, Cu++, Fe+++, or Mn++. Suitable are likewise ammonium cations, especially $NH_4^+$, or substituted ammonium cations derived from one of the following amines: methylamine, dimethylamine, trimethylamine, ethylamine, diethylamine, triethylamine, n-butylamine, di-n-butylamine, tri-n-butylamine, cyclohexylamine, 2-amino-ethanol, bis-(2-hydroxyethyl)-amine.

Preferred esters embraced by Formula I above are, for example: the methyl, ethyl, n-propyl, isopropyl, n-butyl, isobutyl, tert. butyl, n-amyl, isoamyl, n-hexyl, n-heptyl, n-octyl and isooctyl-esters.

It should be noted that the salt or ester moiety ($R_4$) of a fluorene carboxylic acid of Formula I controls the solubility of the molecule, thereby facilitating specific types of formulations, as the need arises. Preferably, the salts are employed where water-soluble formulations are wanted whereas the esters are more suitable for the preparation of emulsion concentrates, or wettable powders. In general, the substituent $R_4$ of the fluorene-9-carboxylic acid is to fit with the derivative chosen for the second active substance present in the combination according to this invention. Thus, for example, an alkali metal salt of a phenoxyalkancarboxylic acid preferably is to be combined with an alkali metal salt of a fluorene-9-carboxylic acid of Formula I.

The following fluorene derivatives are especially useful (Hal stands for F, Cl, Br or J, preferably for Cl or Br):

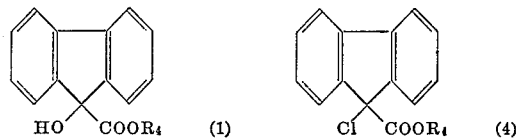

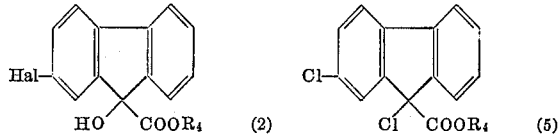

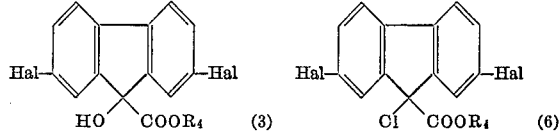

Other compounds of this series are:

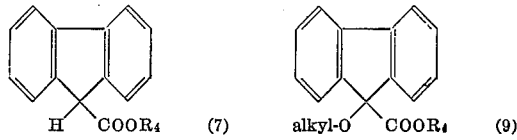

(alkyl of up to 4 carbon atoms)

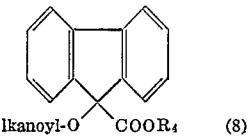

(alkanoyl of up to 7 carbon atoms preferably acetoxy)

As special examples of active compounds the following may be mentioned: 9-fluorenol-9-carboxylic acid and its alkali metal and ammonium salts, furthermore its methyl, ethyl, n-propyl, isopropyl, n-butyl, isobutyl, tert. butyl, n-amyl, isoamyl, n-hexyl, n-heptyl, n-octyl and isooctyl-esters; 9-methoxy - fluorene - 9 - ethoxy-fluorene-, 9-n-butoxyfluorene- and 9 - acetoxy - fluorene - 9 - carboxylic acid and their alkali metal and ammonium salts as well as their methyl, ethyl, n-propyl, isopropyl, n-butyl, isobutyl, tert. butyl and n-heptyl esters; 9 - choloro - fluorene - 9-carboxylic acid and its alkali metal and ammonium salts as well as its esters, such as the methyl, ethyl, n-propyl, isopropyl, n-butyl, isobutyl, tert. butyl, amyl, isoamyl, and heptyl ester.

Further examples of particularly useful compounds include derivatives of those groups of compounds which are mono-or di-substituted in the aromatic rings in 2- or 2,7-position by fluorine, chlorine, bromine or iodine, such as 2-chloro-9-hydroxy - fluorene - 9 - carboxylic acid, 2,9- dichloro-fluorene - 9 - carboxylic acid, 2,7-dichloro-9-9 - fluorenol - 9 - carboxylic acid and 2,7,9 - trichloro-fluorene-9-carboxylic acid as well as the corresponding fluoro-, bromo- and iodo-compounds, especially 2-fluoro-9-fluorenol - 9 - carboxylic acid; 2-bromo-9-fluorenol-9-carboxylic acid; 2-iodo-9-fluorenol-9-carboxylic acid; 2,7-dibromo-9-fluorenol-9-carboxylic acid.

Still further examples of particularly active compounds include fluorene-9-carboxylic acid and its alkali metal and ammonium salts as well its methyl, ethyl, n-propyl, iso-propyl, n-butyl, isobutyl, tert. butyl, n-pentyl, n-hexyl and n-heptyl esters.

The fluorene-9-carboxylic acid derivatives are obtainable according to known methods. Those compounds which are derived from fluorene-carboxylic acids, such as the esters and the salts can be obtained by methods customary for the preparation of esters and salts, respectively.

The esters of 9-fluorenol-9-carboxylic acids (essentially illustrated by the Formulae 1 to 3) can be obtained by direct esterification of the corresponding acid or via the 9-chloro-fluorene-carboxylic acid chloride. This compound is subsequently transformed by known methods into the corresponding ester, and the 9-positioned chlorine atom can be then replaced by a hydroxyl group by treatment with silver hydroxide. If the halogen compound is not treated with silver hydroxide, but with silver nitrate in the presence of an alcohol, the corresponding ethers, e.g. of the Formula 9, are immediately obtained. Analogously, acylation of the 9-fluorenol-9-carboxylic acid esters yields the corresponding 9-acyloxy compounds, e.g. of the Formula 8.

The 9-fluorenol-9-carboxylic acids (1) to (3) serving, in a way, as key substances for the production of the compounds substituted in the 9-position (corresponding to the Formulae 1 to 6, 8 and 9) are obtainable from appropriately substituted phenanthrene-quinone derivatives by the conventional benzilic acid rearrangement. The substituents of the aromatic nuclei can also be introduced directly into the fundamental unsubstituted compound by halogenation. Likewise, halogenation to introduce the substituents $R_1$ and/or $R_2$ may be effected as the last step in the preparation of the compounds characterized by Formula I. This halogenation, too, is likewise carried out according to standard methods well known in the art, for example by direct reaction with the halogen, preferably chlorine or bromine.

The fluorene-9-carboxylic caid and its derivatives according to Formula I are to be used according to the invention in combination with at least one other compound known to be useful in plant treatment. It has been found that the combined application of a compound of Formula I with a number of known herbicides or plant-growth regulating substances in a proportion by weight of 1:50 to 1:1, preferably between 1:9 and 1:4 yields surprisingly better results than the application of either single substance.

It has been found that the compounds of Formula I act in the formative (meristematic) tissues on cell division and cell development and thus affect the formation of the new organs. This influence on the meristematic tissues evidently gives rise to a better response by the plants to the action of the known herbicides and plant growth regulating agents.

Probably because of this fundamental influence on the development of plants, synergism is observed with quite a lot of herbicidal or plant growth regulating agents of most different types. This phenomenon really was unforeseeable.

Compounds of the fluorene type have already been used in certain studies relating to the response of plants treated with such substances. Thus, Jones et al. in J. Sci. Food Agr., volume 5, pages 44 to 47 (1954) describe the inhibition of geotropic and phototropic responses of seedlings of rape, wheat, and ryegrass by 9-fluorenol-9-carboxylic acid and certain of its derivatives. In these tests, it was also observed that the normal plant response to indolylacetic acid or 4-chloro-2-methyl-phenoxy acetic acid was not changed by the fluorene compound treatment. These tests conducted only with parts of plant organs, are not especially pertinent to responses of intact plants in an active state of growth, but if anything, inferentially teach that no beneficial effect is to be obtained by combining a fluorene compound of Formula I with a known herbicide or plant growth regulator. Thus, this reference, on the whole, teaches away from synergism.

A number of fluorene derivatives have also been tested for special responses of plants as described in Plant Regulators, Chemical Biological Coordination Center, Positive Data Series No. 2, June 1955. Likewise, in this case, there is no suggestion whatsoever of the usefulness of any combined application of such fluorene compounds with known herbicides and/or plant growth regulators. In any case, there is certainly nothing in the prior art which even hints that fluorene compounds of Forumla I combined with herbicides or plant growth regulators would lead to markedly improved results in controlling undesirable plant growth.

Examples of herbicides and plant growth regulating substances to be used in combination with the fluorene derivatives of Formula I are in particular: the known phenoxyalkane carboxylic acids and their derivatives widely used as plant growth regulating agents. They may be represented by the following Formula II

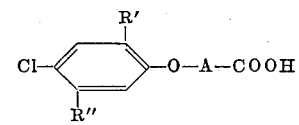

II wherein
R' is selected from the group consisting of chlorine and methyl;
R" is selected from the group consisting of hydrogen and chlorine; and
A is an alkylene group of 1 to 3 carbon atoms;
as well as the salts and esters of these acids commonly used in plant treatment.

Typical examples of such phenoxyalkancarboxylic acids are, for example:

2,4-dichloro-phenoxy-acetic acid
α-(2,4-dichloro-phenoxy)-propionic acid
γ-(2,4-dichloro-phenoxy)-butyric acid
2-methyl-4-chloro-phenoxy-acetic acid
α-(2-methyl-4-chloro-phenoxy)-propionic acid
γ-(2-methyl-4-chloro-phenoxy)-butyric acid
2,4,5-trichloro-phenoxy-acetic acid
α-(2,4,5-trichloro-phenoxy)-propionic acid
γ-(2,4,5-trichloro-phenoxy)-butyric acid Salts of these acids customarily used are preferably the sodium, potassium and ammonium salts, the latter ones including also substituted ammonium salts of up to 8 carbon atoms, the substituents being, for example, alkyl groups of up to 8 carbon atoms; hydroxy alkyl groups of up to 3 carbon atoms; or cyclohexyl. The following ammonium salts are cited for illustration: methyl-, dimethyl-, trimethyl-, ethyl,- diethyl-, triethyl-, n-propyl-, iso-propyl, di-n-propyl-, tri-n-propyl-, n-butyl-, di-n-butyl-, tri-n-butyl-, ethanol-, diethanol-, triethanol-, tri-isopropanol-, cyclohexyl- and oleyl-ammonium as well as 1,3-propylen-diammonium.

The esters of the well known phenoxyalkancarboxylic acids as defined above which are commonly used include the alkyl esters of up to 8 carbon atoms and alkoxyalkyl esters of up to 8 carbon atoms. Esters frequently used are, for example, the methyl, ethyl, n- and iso-propyl, butyl, amyl, isooctyl, propylenbutoxyglycol, and butoxyethyl esters.

In general, the salts and esters of the phenoxyalkane carboxylic acids as defined above may be used in the same way as the acids but they are used instead of the latter ones for purposes of formulation. Depending on the formulation employed and the application intended, either the water-soluble salts or the oil-soluble esters are used.

Besides these phenoxyalkane carboxylic acids, a lot of further compounds known to be useful in plant treatment are suitable to be used in combination with a fluorene derivative of Formula I. For illustration, the following are cited:

Phenoxy derivatives such as 2,4-dichloro-phenoxyethyl sulfate sodium salt, 2-methyl-4-chloro-phenoxyethyl sulfate sodium salt, 2,4,5-trichloro-phenoxyethyl sulfate sodium salt, 2,4-dichloro-phenoxyethanol benzoate, 2-(2,4,5-trichloro-phenoxy)-ethyl 2,2-dichloro-propionate, tris - (2,4 - dichlorophenoxy ethyl)-phosphite; β-naphthocyacetic acid and halocarboxylic acids such as substituted benzoic acids and other arylcarboxylic acids as well as aryl-alkane-carboxylic acids and their derivatives, for example 2,3,6-trichlorobenzoic acid, 2,3,5,6-tetrachlorobenzoic acid, polychlorobenzoic acids, 2,3,5-tri-iodobenzoic acid, 2,4 - dichloro - 3 - nitro-benzoic acids, 3-amino-2,5-dichlorobenzoic acid, 2-methoxy-3,6-dichlorobenzoic acid, 2-methoxy-3,5,6-trichloro-benzoic acid, 2,6-dichlorobenzonitrile and halogeno hydroxy benzonitriles such as 3,5-diiodo-4-hydroxy benzonitrile, further 2 - chloro - 6-methyl-benzonitrile, 2,4,6-trichloro-benzonitrile, 2,3,6 - trichlorophenyl - acetic acid, 2,3,6 - trichlorophenylacetamide, 1-naphthyl-acetic acid; arylphthalamic acids and derivatives, such as N-naphthyl-(1)-phthalamic acid, N-naphthyl-(1)-phthalamide and the di-sodium salt of 3,6-endoxohexahydrophthalic acid; substituted phenylurea derivatives, such as 3-(p-chlorophenyl)-1,1-dimethyl urea, 3-phenyl-1,1 - dimethyl-urea, 3 - (3,4 - dichlorophenyl)-1,1-dimethyl urea, 1-n-butyl-3-(3,4 - dichlorophenyl)-1-methyl urea, 3-(3,4 - dichlorophenyl)-1-methoxy-urea, 3-(1-chlorophenyl)-1-methoxy urea, 1-cyclooctyl-3,3-dimethyl urea, 1,3-bis-(2,2,2-trichloro - 1 - hydroxyethyl) urea; N-phenyl-carbamic acids and their derivatives, such as isopropyl N-phenylcarbamate, isopropyl N-3-chlorophenyl-carbamate, and 4-chloro-2-butinyl N-(3-chlorophenyl)-carbamate; triazoles and triazines, such as 3-amino-1,2,4-triazole, 2-chloro-4,6-bis-(diethylamino)-s-triazine, 2-chloro - 4,6 - bis - (ethylamino)-s-triazine, 2-chloro - 4 - ethylamino - 6 - isopropyl-amino-s-triazine; 2 - chloro - 4,6 - bis-(isoproplyamino)-s-triazine, 2 - chloro-4,6-bis-(diisopropylamino)-s-triazine, 2-methoxy-4,6-bis-(ethylamino)-s-triazine, 2-methoxy-4,6-bis-(diethylamino)-s-triazine, 2-methoxy-4-ethylamino - 6-isopropylamino-s-triazine, 2-methoxy-4,6-bis - (isopropyl-amino)-s-triazine, 2-methoxy-4,6-bis-(diisopropylamino)-s-triazine, 2-methylthio-4,6-bis-(ethylamino)-s-triazine, 2-methylthio - 4,6 - bis-(diethylamino)-s-triazine, 2-methyl-thio - 4-ethylamino-6-isopropylamino-s-triazine, 2-methylthio - 4,6-bis - (isopropylamine)-s-triazine, 2-methylthio-4,6-bis-(diisopropylamino)-s-triazine; halogenated fatty acids and their derivatives, such as trichloroacetic acid; 2,2-dichloropropionic acid, 2,2,3-trichloropropionic acid, 2,2 - dichlorobutyric acid, and N,N - diallyl - chloroacetamide; maleic acid hydrazide and derivatives; thio- and dithio-carbamates, such as 2-chloroallyl diethyl dithiocarbamate, N,N-methyl dithiocarbamate, N,N-di-n-propylthiolcarbamate, 2,3-dichloro- and 2,3,3-trichloroallyl-di-isopropyl thiolcarbamate; dipyridylium derivatives, such as 1,1'-ethylene-2,2'-dipyridylium dibromide, 1,1'-dimethyl-4,4'-dipyridylium dichloride or di-(methylsulfate); pyridazones, such as 1-phenyl-4-amino-5-chloro-6-pyridazone; uracils, such as 5-bromo-3-isopropyl-6-methyl-uracil or 3-n-butyl-6-methyl-uracil; phenols and cresols, such as 4,6-dinitro-2-sec. butylphenol, 4,6-dinitro-o-cresol or pentachlorophenol; indole-3-alkane-carboxylic acids and their derivatives, such as β-indolyl-acetic acid, the corresponding acetonitrile and acetamide and β-indolyl-butyric acid, and also gibberellin and its derivatives, such as gibberellic acid (gibberellin A 3); moreover kinines and their derivatives, such as 6-(2-furfuryl)- aminopurine as well as quaternary ammonium halides, such as β-chloroethyl trimethyl ammonium chloride, (4-hydroxy-5-isopropyl-2-methyl-phenyl -trimethyl ammonium chloride isopropyl-2-methylphenyl)-trimethyl ammonium chloride or [5 - isopropyl - 2-methyl-4-(piperidino-carbonyloxy)-phenyl]-trimethyl ammonium chloride; arylboric acids and their derivatives, such as phenylboric acid; urea and purine derivatives, e.g. adenine and 6-azauracil.

These compounds may be used also in form of derivatives such as for example salts and esters where applicable. Thus, for instance, for formulation purposes maleic acid hydrazide and 3,5-diiodo-4-hydroxy benzonitrile are often used in form of their alkali metal salts, preferably sodium salts, or in form of their ammonium and substituted ammonium (i.e. diethanolammonium and oleylammonium) salts which are commonly used in such plant treatment compositions.

All of these compounds are well known in the art and widely used in plant treatment with different effects. Thus, they embrace herbicides as well as plant growth regulating agents, the latter group including both growth inhibitors and growth stimulants. The fact that the added fluorene derivatives of Formula I are universal in their improvement of prior art formulations is indeed astonishing. It is only by a fundamental modification of the mechanism of all plant growth due to fluorene compound treatment that this is possible. Thus, the spectrum of activity, i.e., the variety of weeds that can be controlled, is extremely broadened since any plant having a meristimatic tissue (i.e., any living plant) responds to the action of the fluorene derivatives of Formula I in a way that makes the plant more responsive to treatment by the other active ingredient of the combination. Therefore, the combinations of this invention are not only highly effective but in addition, are suitable to control weeds of any kind, being especially useful for weeds known to be hard to control.

Preferred formulations are emulsion concentrates dispersions, wettable powders and aqueous solutions with a total content of active ingredient of 20 to 80, preferably about 50, percent by weight.

The compositions embodying the invention can be used for various types of plant growth control. They may serve, for example, as systemically active herbicides for the suppression and/or the total or selective destruction of plant growth. Besides control of annual weeds and grasses, the compositions of this invention are especially useful for eliminating perennial and deep-rooted weeds. Furthermore, they are highly suitable for growth control of trees and bushes.

They can be applied by treatment of the soil (pre-sowing, pre-planting or pre-emergence treatment), or by treatment of the plants (post-emergence treatment). Other possibilities of application include broadcast incorporation into the substrate prior to sowing or planting of the crop plants. Application to plants may be made via the leaves by row or inter-row treatment as well as by spot or single plant treatment.

In post-emergency applications (i.e. treatment of plants) the fluorene derivatives of Formula I in combination with contact herbicides and/or systemically active growth regulators such as the phenoxyalkane carboxylic acid derivatives may be used for selective weed control, for grass control in crops, ornamental plants, orchards and vineyards. Combinations containing growth regulators such as maleic acid hydrazide (optionally mixed up with phenoxyalkane carboxylic acid derivatives) are particularly suitable for broad spectrum growth control and control of growth of trees and bushes. Combinations containing besides fluorene derivatives of Formula I herbicides of the desiccant type such as quaternary ammonium halides are especially useful for delaying new-growth following the quick "overground" herbicidal action.

For pre-emergency application the fluorene derivatives for Formula I are preferably combined with soil herbicides such as, for instance, urea derivatives, triazines, halo-carboxylic acids, and N-phenylcarbamates thereby allowing a broad-spectrum control of deep-rooting perennials and annular weeds and grass species.

In particular, an improvement of the activity of known herbicides against perennial root weeds as well as an extension of the activity range of such herbicides is thus attained. The outstanding activity of the compositions embodying the invention is especially evident by the fact that they effectfully control dicotyledonous weeds, such as cleavers (*Galium aparine*), hem nettle (Galeopsis varieties), cock's foot (Ranunculus varieties), knotgrass (polygonum varieties), chickweed (*Stellaria media*), camomile (Matricaria varieties), Chrysanthemum varieties, which can scarcely be eliminated, or only with great difficulty, by known herbicides alone. The compositions embodying the invention are therefore especially suited for combating broadleaved weeds in cultures of mono-cotyledonous plants.

Additional examples of plants which can be controlled by the agents of this invention are:

Atriplex (orache; Atriplex spp.)
Bindweed, field (wild morning glory; *Convolvulus arvensis*)
Carrott, wild (*Daucus carota*)
Chicory (*Cichorium intybus*)
Cinquefoil (*Potentilla reptans*)
Cleavers (*Galium aparine*)
Cockle, white (*Lychnis alba*)
Corn spurry (*Spergula arvensis*)
Cress, hoary (whitetop; *Cardaria draba*, var. *repens*)
Dandelion (*Taraxacum officinale*)
Deadnettle (henbit; *Lamicum amplexicaule*)
Dock (Rumex spp.)
Fat hen (*Chenopodium album*)
Fumitory (Fumaria spp.)
Groundsel (*Senecio vulgaris*)
Horsenettle (nightshade; Solanum spp.)
Lambsquarters (*Chenopodium album*)
Lettuce, wild (Lacetuca spp.)
Mustard (Brassica spp.)
Nettle (Urtica spp.)
Peppergrass (Lepidium spp.)
Plantain (Plantago spp.)
Quickweed (Galinsoga spp.)
Radish, weld (*Raphanus raphanistrum*)
Speedwell (Veronica supp.)
Thistle (Cirsium spp.)
Vetch (Vicia spp.)
White top (horary cress; *Cardaria draba*)

Furthermore, the compositions of the present invention are useful for eradication and depression of annual and perennial grasses, such as *Avena fatua*, *Alopecurus myosuroides*, *Apera spicaventi*, Poa spp., Bromus spp., Digitaria spp., Sorghum spp., Panicum spp., Echinochloa spp., Agropyron repens.

For controlling plant growth, route experimentation can be used to determine the effective amounts per unit area, depending on the species to be controlled and the density of plant life. In general, however, good plant growth control is obtained when applying the compositions of this invention at a rate of 0.1 to 30 pounds of active ingredients per acre, preferably between 1 and 5 lbs./acre.

Since the combinations of this invention are highly effective, concentrations of about 0.1 to 100,000 p.p.m. (parts by weight per million parts by weight carrier) are generally sufficient to attain the desired goal.

According to modern understanding, agents controlling undesirable plant growth are generally preferred in contrast to completely herbicidal agents. It has been proven that in many instances it is advantageous if the treated plants survive in form of retarded and dwarf plants. These surviving plants do not complete with the crop plants, for example, cereals, for space, water, light and nutrition.

On the other hand, they exhibit a number of positive effects, for instance, formation of humus, soil loosening, and protection against erosion or parching. In view of these considerations, the compositions and the method of treatment according to the present invention are extremely useful.

Highly satisfactory results were obtained, for example, when controlling weeds in cereals by a treatment according to the present invention. Application in the early development stage of the weeds is recommended. Field tests in most different areas showed a very good compatability of the combinations of this invention with the cereals.

Extensive investigations have provide that the combinations of this invention especially those containing besides the fluorene derivatives of Formula I a compound from the series of phenoxy-alkane carboxylic acids of Formula II are broken down in the soil within a few weeks or even days so that there are no problems with respect to undesired residues.

Data taken from cereals treated, for example, with a mixture of 2 - ethylhexyl-(2-methyl-4-chloro)-phenoxy acetate and n-butyl-9 - fluorenol-9-carboxylate indicated that the yield was not reduced. Also baking capacity tests with wheat thus treated were positive and did not show any influence of the treatment with the composition according to this invention.

In further large field tests, the combinations embodying the invention have proved to be effective growth retardants for a broad range of grass species used, for example, along highways and similar turf areas. Especially useful were the synergistic mixtures of maleic acid hydrazide with a fluorene derivative of Formula I, in particular methyl 2-chloro-9-fluorenol-9-carboxylate. Test plots were confined entirely to turf bordering major state or interstate highways. In two areas, tests were established on the vegetation bordering golf fairways and, in a third situation, applications were made on a variety of ground cover and shrubs and trees commonly used on freeway plantings. The ground cover and the trees and shrubs were all of the non deciduous type and typical of a Mediterranean climate.

Additional advantages observed in these tests included less discoloration of the treated grasses—an undesired side-effect often occurring in treatment with maleic hydrazide. In fact, in many instances, plots treated with the combinations embodying the invention were darker green in color than plot areas untreated or treated with maleic acid hydrazide alone. In considering these on areas traversed by people, a number of species of treated grasses showed a springy, open-type of growth without matting of the turf-characteristics in which the use of maleic acid hydrazide had a negative result.

Furthermore, the combinations of this invention, especially those with maleic hydrazide, have been found highly efficient for broadleaved and annual grass weed control in turf. Outstanding results were obtained in controlling a wide variety of undesirable weed species common to turf in most areas whereas maleic hydrazide is lacking in this beneficial effect.

Another very promising application of the fluorene derivatives of Formula I in combination with maleic acid hydrazide is the slowing down the growth of trees and shrubs. This is, for instance, important where tree branches must be reduced continuously in order to avoid that they envelop power lines. Thus, eucalyptus trees were sprayed with a composition containing a fluorene derivative of Formula I and maleic acid hydrazide. Some other very similar trees were left unsprayed. Over 18 months the trees sprayed with the combination grew very slowly whereas the untreated trees continued normal growth and by the end of the 18 months needed pruning. Usually, trees and vegetation even respond with a more luxuriant appearance after treatment since treatment shortens the internodes of the item and thus brings leaves closer together.

Preferred compositions of this invention are those containing at least one fluorene compound of Formula I in combination with at least one phenoxyalkane carboxylic acid derivative of Formula II. Typical examples are, for instance, the following:

2-ethylhexyl-(2-methyl-4-chloro-phenoxy)-acetate methyl-9-fluorenol-9-carboxylate
2-ethylhexyl-(2-methyl-4-chloro-phenoxy)-acetate methyl-2-chloro-9-fluorenol-9-carboxylate
2-ethylhexyl-(2-methyl-4-chloro-phenoxy)-acetate n-butyl-2,7-dichloro-9-fluorenol-9-carboxylate
2-ethylhexyl-(2-methyl-4-chloro-phenoxy)-acetate n-butyl-9-fluorenol-9-carboxylate
2-n-butoxyethyl-(2-methyl-4-chloro-phenoxy)-acetate n-butyl-9-fluorenol-9-carboxylate
2-methyl-4-chloro-phenoxybutyric acid 9-fluorenol-9-carboxylic acid
isopropyl-(2,4-dichloro-phenoxy)-acetate propyl-2-chloro-9-fluorenol-9-carboxylate
sodium-(2-methyl-4-chloro-phenoxy)-acetate sodium-2-chloro-9-fluorenol-9-carboxylate
sodium-2,4-dichloro-phenoxyacetate sodium 2,7-dibromo-9-fluorenol-9-carboxylate
(2-n-butoxyethyl)-2-methyl-4-chloro-phenoxypropionate isobutyl-2-chloro-9-fluorenol-9-carboxylate Other highly useful combinations include the following:

1,1'-dimethyl-4,4'-bi-pyridiliumdichloride sodium 2-chloro-9-fluorenol-9-carboxylate
maleic acid hydrazide methyl-2-chloro-9-fluorenol-9-carboxylate
3,5-diiodo-4-hydroxy-benzonitril sodium salt sodium 2-chloro-9-fluorenol-9-carboxylate
3,5-diiodo-4-hydroxy-benzonitril-oleylamine salt butyl-9-fluorenol-9-carboxylate The new agents can be worked up into all forms of preparations customary for plant protective or plant-combating agents. Thus, for example, the agents can be applied in solid or liquid form by spraying, pouring, scattering or dusting according to the known methods customarily used in plant protection. The usual additives or fillers are used, such as bole, kaolin, bentonite, ground shale, talc, chalk, dolomite, silicic acid, calcium silicate, or kieselguhr, if solid preparations are concerned. For liquid formulations, cyclohexane, xylene, solvent-naphtha, petroleum, acetone, methyl ethyl ketone, diethyl ketone, methyl isobutyl ketone, isophorone, cyclohexanone, dimethyl formamide, dimethyl sulfoxide, dioxane, N-methylpyrrolidone or aliphatic alcohols are preferably used as solvents. The emulsion concentrates thus prepared can be marketed as such. Prior to use the emulsion concentrates are diluted with water in usual manner. If agents are used which contain water-soluble substances as active ingredients, water, of course, can also be used as solvent or diluent for the preparation of the concentrate.

The high activity of the compositions embodying the invention has further been demonstrated by a large number of biological experiments and a lot of field trials.

The compounds used in the experiments described below for the sake of simplicity are designated as follows:

A = 9-fluorenol-9-carboxylic acid sodium salt
B = n-butyl 9-fluorenol-9-carboxylate
C = 2-chloro-9-fluorenol-9-carboxylic acid
D = 9-fluorenol-9-carboxylic acid
E = 2,7-dichloro-9-fluorenol-9-carboxylic acid
F = 9-chloro-fluorene-9-carboxylic acid
G = methyl 2-chloro-9-fluorenol-9-carboxylate
H = ethyl fluorene-9-carboxylate
J = n-butyl 9-n-butoxy-fluorene-9-carboxylate
K = methyl 9-acetoxy-fluorene-9-carboxylate
L = n-butyl 2,7-dibromo-9-fluorenol-9-carboxylate
M = n-heptyl 2-chloro-9-fluorenol-9-carboxylate
N = 2-iodo-9-fluorenol-9-carboxylic acid O = 2-fluoro-9-fluorenol-9-carboxylic acid
I = 2-methyl-4-chloro-phenoxy-acetic acid
II = 2-methyl-4-chloro-phenoxy-acetic acid sodium salt
III = 2-methyl-4-chloro-phenoxy-acetic acid potassium salt
IV = 2-methyl-4-chloro-phenoxy-acetic acid dimethyl ammonium salt
V = 2-ethylhexyl-(2-methyl-4-chloro-phenoxy)-acetate
VI = α-(2-methyl-4-chloro-phenoxy)-propionic acid
VII = 2-n-butoxyethyl-α-(2-methyl-4-chloro-phenoxy)-propionate
VIII = 2,4-dichloro-phenoxy-acetic acid sodium salt
IX = 2,4-dichloro-phenoxy-acetic acid dimethyl ammonium salt
X = 2,3,6-trichloro-benzoic acid
XI = 2,3,6-trichloro-benzoic acid sodium salt
XII = T,3,5-triiodo-benzoic acid
XIII = n-hexyl 2,4,5-trichloro-phenoxy-acetate
XIV = 2,4-dichloro-phenoxy-acetic acid
XV = 2,4,5-trichloro-phenoxy-acetic acid
XVI = γ-(2-methyl-4-chloro-phenoxy)-butyric acid
XVII = gibberellin A 3
XVIII = maleic acid hydrazide
XIX = 1,1'-dimethyl-4,4'-bipyridylium-dichloride
XX = isopropyl N-(3-chlorophenyl)-carbamate
XXI = N-(4-chlorophenyl)-N,N'-dimethyl-urea
XXII = 2-chloro-4,6-bis-(ethylamino)-triazine
XXIII = trichloroacetic acid
XXIV = 2,2-dichloropropionic acid
XXV = 2-ethylhexyl(2,4-dichlorophenoxy)-acetate
XXVI = 3,5-diiodo-4-hydroxy-benzonitrile
XXVII = [5-isopropyl-2-methyl-4-(piperidinocarbonyloxy)-phenyl]-trimethylammonium chloride
XXVIII = 2-chloroethyl-trimethylammonium chloride
XXIX = 3-amino-1,2,4-triazole Similar results may be obtained in these experiments with the following compounds:

other alkyl 9-fluorenol-9-carboxylates
    wherein the alkyl group contains up to 8 carbon atoms;
2-chloro-9-fluorenol-9-carboxylic acid sodium salt;
other alkyl 2-chloro-9-fluorenol-9-carboxylates,
    wherein the alkyl group contains up to 12 carbon atoms, especially the ethyl, n-propyl and n-butyl ester;
2-bromo-9-fluorenol-9-carboxylic acid and its sodium salt;
lower alkyl 2-bromo-9-fluorenol-9-carboxylates, especially the n-butyl ester;
n-butyl 2,7-dichloro-9-fluorenol-9-carboxylate;
2,7-dibromo-9-fluorenol-9-carboxylic acid and its sodium salt;
9-chloro-fluorene-9-carboxylic acid sodium salt;
lower alkyl 9-chloro-fluorene-9-carboxylates;
2-iodo-9-fluorenol-9-carboxylic acid sodium salt;
lower alkyl 2-iodo-9-fluorenol-9-carboxylates.

In the following experiments, all proportions are given by weight.

EXPERIMENT 1

Young seedlings of *Galium aparine* were planted in 8 cm. plastic pots (3 per pot) and treated after 2 days at an early seedleaf stage. The preparations of active substance were applied by placing a droplet of 0.02 ml. on each seedleaf (0.04 ml. per plant, 6 plants per treatment). The activity was determined as a reduction of longitudinal growth after treatment (in cm. and according to number of internodes) and by evaluation of the deformations of various kinds, as well as of the increase of axillary leaf sprouts. The percentages of deformations were determined (0 = no findings, 1 = 25%, 2 = 50%, 3 = 100%, deformed = practicaly leafless sprout axils); the table contains the mean value numbers. The active substances and the combinations were uniformly formulated as 50% emulsion concentrates with the same emulsifiers and petroleum.

| | Conc. (p.p.m.) | Reduction of longitudinal growth, cm. | Number of added internodes, percent of untreated control | Mean value number | Increase in axil sprouting, percent controls |
|---|---|---|---|---|---|
| Active substance: | | | | | |
| B | 5 | 20 | 18 | 18 | 33 |
| V | 20 | 10 | 16 | 0 | 0 |
| Total | 25 | 30 | 34 | 18 | 33 |
| B+V, 1=4 | 25 (5+20) | 45 | 50 | 55 | 50 |

The experiment shows the superior activity of the combination according to the invention (B+V) compared with the activity of the active components employed proportionately.

EXPERIMENT 2

Young plants of *Galeopsis spec.* and *Galium aparine* were planted in 8 cm. plastic pots (3 per pot) and sprayed from above at an angle of 45° after 2 days (2–3 nodes stage; spraying pressure: 0.5 atmospheres, spraying period: 8 seconds; 3 pots per treatment). The inhibition of (a) the longitudinal growth, (b) the number of sprouting axially leaf buds, (c) the deformation of the leaves, the sprout axils ad the lateral shoots were evaluated. Evaluation took place according to a scale from 0 to 3 (0=no findings, 1=weak, 2=strong, 3=very strong). The activity is expressed by a value member established from the evaluation indices by averaging numbers awarded in respect of (a), (b) and (c). All active substances were used as 20% aqueous solutions without formulation additives; 0.02% of a highly concentrated alkylaryl polyglycol ether preparation was used as wetting agent.

| | Galeopsis | | Galium | |
|---|---|---|---|---|
| Active substance | Conc. (p.p.p.) | Value number | Conc. (p.p.m.) | Value number |
| A+II, 3:1 | 50 | 8 | 50 | 7 |
| II+XI, 3:1 | 50 | 2 | 50 | 4 |
| A+II, 4:1 | 50 | 7 | 50 | 5 |
| II+VIII, 4:1 | 50 | 1 | 50 | 0 |

It can be seen from the table that the combinations according to the invention (A+II) are substantially superior to the known growth-regulating combinations with comparable proportions of active ingredients.

EXPERIMENT 3

The same test method and evaluation was used as in Experiment 2. For *Galeopsis spec.*, the stalk proliferations which occurred were evaluated instead of lateral shoots. All substances were used as 50% formulations as indicated in Experiment 1.
Result:

| | Galeopsis | | Galium | |
|---|---|---|---|---|
| Active substance | Conc. (p.p.m.) | Value number | Conc. (p.p.m.) | Value number |
| B | 100 | 2 | 50 | 6 |
| V | 100 | 6 | 50 | 2 |
| VII | 100 | 0 | 50 | 2 |
| B+V, 1:4 | 100 | 9 | 50 | 8 |
| V+XIII, 3:2 | 100 | 6 | 50 | 1 |
| I+X, 3:1 | 100 | 4.5 | 50 | 4 |

The table shows that the combination according to the invention (B+V) is superior to the single active ingredients and to comparable commercial growth-regulating combinations.

EXPERIMENT 4

Clay dishes of 20 x 20 cm. were planted with young plants of Galeopsis, Galium, Polygonum and Matricaria (stage of 2–4 nodes). After four days, the dishes were sprayed vertically from above with 60 ml. of the preparations. The water consumption corresponds to about 10.000 liters/ha. The following characteristics were evaluated according to the scale 0 to 3 (0=no findings, 3=very strong) and the value numbers were established from the evaluation indices of deformations, inhibition, stalk proliferations and shoots as indicated in the following table. With the exception of the agents characterized as "commercial preparation," the formulation of the preparations correspond to that indicated for the Experiment 1. Equal amounts of active substances (50 p.p.m.) were applied.

| Evaluation | II+III,[1] 45%/ 0.011% | V, 50%/ 0.01% | I+X,[1] 3:1, 20%/0.025% | B+V, 1:9, 50%/0.01% | B+V, 2:8, 50%/0.01% |
|---|---|---|---|---|---|
| Galium, value number | 1 | 2 | 3 | 7 | 8 |
| Galeopsis, value number | 2 | 5 | 2 | 8 | 9 |
| Polygonum, value number | 1 | 6 | 2.5 | 6 | 9 |
| Matricaria, value number | 1 | 3 | 1 | 4 | 4 |

[1] Commercial preparation.

Referring to the commercial preparation of 2-methyl-4-chlorophenoxy-acetic acid sodium and potassium salt (II+III)=1, the following relative efficiency factors of the preparations become evident from the table:

1 fold for II+III
3 fold for V
1.5–2 fold for I+X
5 fold for B+V, 1:9
6 fold for B+V, 2:8

The combinations according to the invention (B+V) thus possess a superior activity.

EXPERIMENT 5

Fields of spring barley and oats strongly infested with *Galinsoga parviflora*, *Glechoma hederacea*, *Stellaria media* and *Polygonum convolvus* were sprayed vertically from above. The water consumption was 1.000 liters/ha. At the time of spraying, the grain was at a late stage of sprouting, the weeds were in the preblossom stage with 3 to 6 secondary leaves. Evaluated were (a) percentage of destruction compared with the control, and (b) state of the surviving plants. Compound B was formulated as 50% wettable powder with sulfite waste liquor, $SiO_2$, bole and a wetting agent. The other preparations were formulated as indicated for Experiment 1, likewise with a 50% amount of active substance.

| | Plant Spray conc. | | | | | | | |
|---|---|---|---|---|---|---|---|---|
| | Galinsoga, 0.025% | | Glechoma, 0.05% | | Stellaria, 0.05% | | Polygonum, 0.05% | |
| Preparation | (a) | (b) | (a) | (b) | (a) | (b) | (a) | (b) |
| B | 50 | 4.5 | 0 | 1 | 0 | 6 | 0 | 8 |
| V | 90 | 4.5 | 0 | 1 | 0 | 2.5 | 25 | 4 |
| B+V, 1:9 | 100 | | 50 | 3 | 0 | 3 | 50 | 8 |
| B+V, 2:8 | 100 | | 100 | | 50 | 4.5 | 50 | 8 |

It can be seen from the table that the combinations according to the invention possess, even under open air conditions, a substantially stronger herbicidal activity than the known 2-methyl-4-chloro-phenoxy-acetic acid isoctyl ester. In all allotments, spring barley and oats did not show any damages.

EXPERIMENT 6

The method described for Experiment 4 was used. The weeds were *Polygonum convolvulus* at the 3 to 4 leaves stage and Galeopsis spec. at the 4 to 5-leaves stage (prebloom). Water consumption: 60 liters/hectar. Deformations, inhibitions of growth, stalk proliferations and blooms delays were evaluated according to the scale 0 to 3 (0=no findings, up to 3=very strong). Evaluation took place 5 weeks after treatment. Compound V as well as the preparation V+B were formulated according to Experiment 1. The two other combinations are well known commercial compositions. All preparations were used underdosed with the same amount of active substance (a total of 750 g. of active substance per hectar).

| Preparation | Herbicidal value Galeopsis | Herbicidal value Polygonum | Relative activity value for both weeds (V=1) |
|---|---|---|---|
| V | 3 | 3 | 1 |
| B+V, 4:1 | ¹10 | 8 | 3 |
| I+X, 3:1 | 4 | 2 | 1 |
| V+XIII, 3:2 | 6 | 0 | 1 |

¹ Almost lethal.

It can be seen from the table that the combination according to the invention (B+V) possesses about three times the herbicidal activity of the comparable known preparations.

EXPERIMENT 7

In a wheat field (winter wheat variety "Rekord") infested with Matricaria, spraying was effected when the height of the wheat was about 35 cm. and that of Matricaria about 10 cm. Results were established 5 weeks after spraying. In the following table, the figures of the middle column denote the amount in litres of emulsion concentrate applied per hectar of wheat field. Before spraying, the indicated amount in litres of emulsion concentrate was diluted each time with 600 litres of water.

| | Dosage+ha. | Result in percent |
|---|---|---|
| Preparation: | | |
| B+V, 1:9 | 4 | 95 |
| I+X, 3:1 | 6 | 75 |
| IV+IX, 40.7:16.3 | 4 | 80 |
| V | 4 | 45 |
| Untreated | | 0 |

It can be seen from the table that the combination according to the invention (B+V) containing as active substance an ester of 2-methyl-4-chloro-phenoxy-acetic acid besides a 9-fluorenol-9-carboxylic acid ester, acts twice as strongly as an agent (V) containing as sole active ingredient the same ester of 2-methyl-4-chloro-phenoxy-acetic acid, even at a higher concentration. Compared with the commercial combination preparations (I+X and IV+IX) the combination according to the invention possesses an activity increased by about 20 to 25%.

EXPERIMENT 8

Cynoglossum plants in the cotyledonary stage are treated treated with a drop of 0.01 ml of the test solution onto each of both cotyledons. The effect is judged 4 weeks after treatment, deformations (De.), inhibition of development (In.) and proliferations (Pr.) of the hypocotyl.

Evaluation scale: 0 (no findings) to 5 (totally destroyed). The combinations contain the active substances in the proportion 1:1

| | Concentration in p.p.m. | | | | | | | | | | | | | | |
|---|---|---|---|---|---|---|---|---|---|---|---|---|---|---|---|
| | 500 | | | 200 | | | 100 | | | 50 | | | 25 | | |
| | De. | In. | Pr. | De. | In. | Pr. | De. | Inc. | Pr. | De. | In. | Pr. | De. | In. | Pr. |
| Preparation: | | | | | | | | | | | | | | | |
| I | | | | 1 | 1 | 1 | 1 | 1 | 1 | 1 | 1 | 1 | 1 | 0 | 1 |
| C | | | | 3 | 3 | 0 | 3 | 2 | 0 | 2 | 2 | 0 | 2 | 1 | 0 |
| C+I | | | | 3 | 4 | 3 | 4 | 3 | 2 | 3 | 2 | 2 | 3 | 2 | 2 |
| XIV | | | | 2 | 2 | 1 | 2 | 2 | 1 | 2 | 2 | 1 | 2 | 1 | 0 |
| C | | | | 3 | 3 | 0 | 3 | 3 | 0 | 2 | 2 | 0 | 2 | 1 | 0 |
| C+XIV | | | | 3 | 4 | 3 | 3 | 4 | 3 | 3 | 4 | 2 | 3 | 2 | 1 |
| I | 2 | 2 | 2 | 1 | 1 | 1 | 1 | 1 | 1 | | | | | | |
| D | 1 | 0 | 0 | 0 | 0 | 0 | 0 | 0 | 0 | | | | | | |
| D+I | 3 | 4 | 2 | 2 | 2 | 2 | 2 | 2 | 0 | | | | | | |
| I | 2 | 2 | 2 | 1 | 1 | 1 | 1 | 1 | 1 | | | | | | |
| E | 2 | 2 | 0 | 1 | 0 | 0 | 0 | 0 | 0 | | | | | | |
| E+I | 3 | 4 | 3 | 3 | 2 | 1 | 3 | 2 | 0 | | | | | | |
| I | 2 | 2 | 2 | 1 | 1 | 1 | 1 | 1 | 1 | | | | | | |
| F | 0 | 1 | 0 | 0 | 0 | 0 | 0 | 0 | 0 | | | | | | |
| F+I | 3 | 4 | 2 | 3 | 2 | 0 | 2 | 2 | 0 | | | | | | |
| V | | | | 2 | 2 | 2 | | | | 1 | 1 | | | | |
| H | | | | 1 | 1 | 0 | | | | 0 | 0 | | | | |
| H+V | | | | 3 | 3 | 2 | | | | 2 | 2 | | | | |
| V | | | | 2 | 2 | 2 | | | | 1 | 1 | | | | |
| J | | | | 0 | 1 | 0 | | | | 0 | 0 | | | | |
| J+V | | | | 2 | 3 | 2 | | | | 1 | 2 | | | | |
| V | | | | 2 | 2 | 2 | | | | 1 | 1 | | | | |
| K | | | | 2 | 1 | 0 | | | | 0 | 0 | | | | |
| K+V | | | | 3 | 3 | 3 | | | | 2 | 2 | | | | |
| V | | | | 2 | 2 | 2 | | | | 1 | 1 | | | | |
| L | | | | 2 | 2 | 0 | | | | 1 | 0 | | | | |
| L+V | | | | 3 | 3 | 3 | | | | 3 | 2 | | | | |
| V | | | | | | | 1 | 2 | 1 | | | | 1 | 1 | |
| M | | | | | | | 2 | 3 | 0 | | | | 1 | 1 | |
| M+V | | | | | | | 3 | 3 | 2 | | | | 2 | 2 | |
| XXV | | | | 3 | 3 | 2 | | | | 2 | 2 | 1 | | | |
| L | | | | 2 | 2 | 0 | | | | 1 | 0 | 0 | | | |
| L+XXV | | | | 3 | 3 | 2 | | | | 2 | 3 | 1 | | | |
| XXV | | | | | | | 2 | 2 | 1 | | | | 2 | 2 | 1 |
| M | | | | | | | 2 | 3 | 0 | | | | 1 | 1 | 0 |
| M+XXV | | | | | | | 3 | 3 | 3 | | | | 2 | 3 | 2 |

The proliferations (Pr.) were not evaluated in some experiments with lower concentrations.

From the table, the superior efficiency of the combinations compared to the single active substances can be seen.

EXPERIMENT 9

In general, *Galeopsis spec.* and *Polygonum convolvulus* are controlled preferentially with 2,4,5-trichlorophenoxyacetic acid (XV). The efficiency can be increased considerably by application of combinations according to the invention.

Experimental method. The first true leaves of young plants of Galeopsis or Polygonum, respectively, are treated with drops of 0.02 ml. of the test solution. The leaf deformations developed after treatment are evaluated 3 weeks after application.

Evaluation scale: 0 (no findings) up to 3 (very strong).

In the combinations, the active substances are combined in a proportion by weight of 1:1.

| Active subst. | Galeopsis Concentration in p.p.m. | | | | | Polygonum convonvulus Concentration in p.p.m. | | | | |
|---|---|---|---|---|---|---|---|---|---|---|
| | 6 | 12 | 25 | 50 | 100 | 12 | 25 | 50 | 100 | 200 |
| XV | 1 | 1 | 1 | 1 | 1-2 | 0 | 1 | 1 | 1 | 2 |
| D | 1 | 1 | 1-2 | 1-2 | 2-3 | 0 | 0 | 1 | 1 | 2 |
| C | 1-2 | 1-2 | 2-3 | 2-3 | 3 | 0 | 1 | 1-2 | 3 | 3 |
| D+XV | 1-2 | 2-3 | 3 | 3 | 3 | 1 | 2 | 2-3 | 2-3 | 3 |
| C+XV | 3 | 3 | 3 | 3 | 3 | 1 | 2-3 | 3 | 3 | 3 |

EXPERIMENT 10

*Galinsoga parviflora* is sprayed by post emergence treatment. Evaluation after 2 weeks.

Evaluation scale: 0 (no findings) up to 4 (totally destroyed).

| | 40 | 20 | 10 | Sum of value numbers (3 concentrations) |
|---|---|---|---|---|
| Active substance: | | | | |
| VI | 1 | 1 | 0 | 2 |
| D | 2 | 2 | 2 | 6 |
| D+VI | 3 | 3 | 2 | 8 |

EXPERIMENT 11

Clay dishes with corn (*Zea mays*) as crop plant and *Galium aparine*, *Matricaria spec.* and *Cynoglossum vulgare* as weeds are each sprayed with 40 ml. of the test solution. The effect is evaluated after four weeks. Value numbers for the weeds are from 0 (no findings) to 6 (totally destroyed); they are obtained by addition of the values for leaf deformation and inhibition of development. The evaluation scale of the state of the corn ranges form 0 (no findings) to 3 (strongly inhibited).

| | Galium | | Matricaria | | Cynoglossum | | Inhibition of corn | |
|---|---|---|---|---|---|---|---|---|
| | 12.5 p.p.m. | 25.0 p.p.m. | 12.5 p.p.m. | 25.0 p.p.m. | 12.5 p.p.m. | 25.0 p.p.m. | 12.5 p.p.m. | 25.0 p.p.m. |
| Active substance: | | | | | | | | |
| XVI | 0 | 0 | 1 | 3 | 1 | 1 | 3 | 3 |
| D | 3 | 4 | 2 | 4 | 1 | 3 | 0 | 0-1 |
| D+XVI, 1:1 | 3 | 4 | 4 | 6 | 1 | 3 | 0 | 0-1 |
| D+XVI, 1:4 | 3 | 5 | 5 | 5 | 3 | 3 | 0 | 1 |

It can be seen from the table that the combinations are very effective against the weeds; simultaneously they show a good compatibility with the corn crop.

EXPERIMENT 12

The combination of derivatives of fluorene-9-carboxylic acid with gibberellin A 3 (XVII) results in a phytotoxic incompatibility which is not caused by any of the single active substances.

Experimental method: Plants of celery (*Apium graveolens*) of 8 weeks age are sprayed with the test solutions. The substances are dissolved in a mixture of 8% acetone and 92% water. Tween 20 is added and the mixtures are diluted with water to the given concentrations; 12 ml. of the test solution is applied to each plant. The experiments are evaluated 6 weeks after treatment.

Evaluation scale: 0 (no findings) to 3 (very strong efficiency).

| | Efficiency | | | |
|---|---|---|---|---|
| | 50 p.p.m. | 100 p.p.m. | 200 p.p.m. | 500 p.p.m. |
| Active substance: | | | | |
| C | 0 | 0 | 0 | 1 |
| XVII | 0 | 0 | 0 | 0 |
| C+XVII, 1:1 | 1 | 2 | 3 | 3 |

Similar efficiencies are observed with other resette plants as *Lactuca sativa* and caulescent plants, for example Galium.

Corresponding experiments performed with (4-hydroxy-5-isopropyl-2-methylphenyl) - trimethylammonium chloride instead of XVII yielded similar results.

EXPERIMENT 13

In general, maleic acid hydrazide (XVIII) is used for the control of grass-like plants. By combination with derivatives of fluorene-9-carboxylic acid, monocots as well as dicots can be controlled, too.

Experimental method: *Galium aparine* and *Cynoglossum vulgare* are sprayed with the test solution three weeks post emergence. The experiments are evaluated 8 weeks after treatment; evaluation scale: 0 (no findings) to 5 (totally destroyed).

| Active substance | Concentration p.p.m. | Evaluation of efficiency | |
|---|---|---|---|
| | | Galium | Cynoglossum |
| C | 125 | 3 | 3 |
| XVIII | 125 | 1-2 | 1 |
| C+XVIII, 1:1 | 125 | 3-4 | 3 |
| C | 250 | 3 | 3-4 |
| XVIII | 250 | 1-2 | 1-2 |
| C+XVIII, 1:1 | 250 | 4 | 4 |
| N | 250 | 3 | 3 |
| XVIII | 250 | 2 | 2 |
| N+XVIII, 1:1 | 250 | 4 | 4 |
| O | 250 | 2-3 | |
| XVIII | 250 | 3 | |
| O+XVIII, 1:1 | 250 | 4 | |

EXPERIMENT 14

*Cynglossum vulgare* is resistant against 3-amino-1,2,4-triazole (XXIX), whereas *Agropyron repens* can be controlled by fluorene-9-carboxylic acid derivatives (such as C) with difficulty only. A combination of both active substances gives excellent results in controlling these two weeds.

Experimental method: Young plants of *Cynoglossum* and rhizoms of *Agropyron* are sprayed with 40 ml. of the test solution at three different stages of development. With 500 ppm. of a combination of XXIX and C (1:1), the weeds are totally destroyed (evaluation number 5), whereas only a partial success can be obtained by application of each single substance in a corresponding concentration (evaluation numbers 4 and 3 respectively).

EXPERIMENT 15

The known 1,1'-dimethyl-4,4'-bipyridylium-dichloride (XIX) effects a rapid desiccation of overground vegetation; in general, however, an early regrowth of the treated area occurs. By treatment with combination according to the invention, any regrowth of vegetation is retarded effectively.

Experimental method: An area covered with plants 20 to 50 cm. high (*Tanacetum vulgare*, *Artemisia vulgaris*, *Cirsium arvense*, *Agropyron repens* and *Chenopodium album*) is sprayed with 1000 l. of the test solutions per hectar.

With a concentration of 1000 g. of active substance per hectar, the areas treated with a combination preparation of XIX and C (1:1) did not show any appreciable regrowth 8 weeks after application, whereas considerable regrowth occurred in those areas treated with corresponding amounts of the single substances XIX or C.

Comparable results were obtained when using 1,1'-dimethyl-4,4'-bipyridylium-di-(methylsulfate) or 1,1'-ethylene-2,2'-di-pyridylium-dibromide instead of XIX.

EXPERIMENT 16

Control of *Polygonum convolvulus, Stellaria media* and *Galium aparine* in wheat or barley with 2-ethylhexyl-(2-methyl-4-chloro-phenoxy)-acetate (V), with methyl 2-chloro-9-fluorenol-9-carboxylate (G) and with their combinations.

The preparation containing G alone was formulated as 12.5% emulsion concentrate, all other preparations were formulated as 50% emulsion concentrates. Experimental allotments of 10 m.$^2$ were sprayed with 1000 liters/hectar water. The evaluation (0=no findings, up to 6=weeds completely killed) took place 3 weeks after treatment.

| Active substance | Concentration (g./ha.) V | G | Polygonum | Stellaria | Galium |
|---|---|---|---|---|---|
| V | 600 | — | 3 | 2–3 | 1 |
|   | 600 | — | 3 | 3 | 1 |
|   | 1,200 | — | 4 | 3 | 2 |
| G | — | 150 | 1–2 | 2 | 2–3 |
|   | — | 300 | 3 | 2 | 3–4 |
| G+V, 1:4 | 720 | 180 | 5 | 6 | 5–6 |
|   | 960 | 240 | 6 | 6 | 6 |
| G+V, 1:9 | 810 | 90 | 5 | 5 | 5 |
|   | 1,080 | 120 | 6 | 5–6 | 5–6 |

The combinations according to the invention exhibited a considerably stronger efficiency than the single active substances. The crops of wheat and barley showed only temporarily some small distortions; after three weeks, they had regained a normal state.

EXPERIMENT 17

Clay dishes containing root pieces of *Agropyron repens* and *Convolvulus arvensis* (length 6 to 8 cm; precultivation time 14 days) as well as seeds of *Chenopodium album, Cynoglossum vulgare, Matricaria chamomilla* and *Urtica urens* (sowed in one day before spraying) in compost substrate are sprayed from above with a water expenditure of 10 ml. per dish.

Evaluation 5 weeks after treatment (0=no findings, 5=totally destroyed).

| | Concentration, mg./dish | Perennials | | Annuals | | | |
|---|---|---|---|---|---|---|---|
| | | Agropyron | Convolvulus | Matricaria | Chenopodium | Urtica | Cynoglossun |
| Active substance: | | | | | | | |
| XX | 20 | 1 | 2–3 | 0 | 3–4 | 0 | 3–4 |
|    | 40 | 1–2 | 2–3 | 0 | 4 | 3 | 4 |
| G  | 40 | 1 | 2 | 2 | 3–4 | 2 | 4 |
|    | 80 | 2 | 2 | 3 | 3–4 | 2 | 4–5 |
| G+XX | 40+20 | 2–3 | 3 | 4–5 | 5 | 4–5 | 4–5 |

The experiment shows that the combination (G+XX) is more effective than each one of its components.

Similar results are obtained when XX is substituted by isopropyl-N-phenyl-carbamate or 4-chloro-2-butinyl-N-(3-chloro-phenyl)-carbamate.

EXPERIMENT 18

Experimental method and evaluation: same as in Experiment 17. Test plants: *Agropyron repens* and *Convolvulus arvenis*.

| Active substance | Concentration, mg./dish | Agropyron | Convolvulus |
|---|---|---|---|
| XXI | 5 | 0–1 | 1–2 |
|     | 10 | 2 | 2–3 |
| G   | 40 | 3 | 2 |
|     | 80 | 2 | 2 |
| G+XXI | 40+5 | 1–2 | 4 |
|       | 80+5 | 2–3 | 5 |
|       | 40+10 | 3 | 4–5 |
|       | 80+10 | 3 | 5 |
| XXII | 5 | 0 | 0–1 |
|      | 10 | 0–1 | 1 |
| G    | 40 | 1 | 2 |
|      | 80 | 2 | 2 |
| G+XXII | 40+5 | 1–2 | 2–3 |
|        | 80+5 | 2–3 | 3–4 |
|        | 40+10 | 2 | 3 |
|        | 80+10 | 3 | 4 |

This is a further example to show the superiority of the combinations according to the invention as compared to the single active ingredients.

Instead of XXI, other compounds of this type may be used with comparable results, for instance 3-phenyl-1,1-dimethylurea, 3 - (3,4-dichlorophenyl)-1,1-dimethylurea, 1-n-butyl-3-(3,4-dichlorophenyl) - methyl-urea, 3-(3,4-dichlorophenyl)-1-methoxy-urea, 3 - (1-chlorophenyl)-1-methoxy-urea, 1 - cyclooctyl-3,3-dimethyl-urea, 1,3-bis-(2,2,2-trichloro-1-hydroxyethyl)-urea.

Similar results were obtained when using instead of XXII other herbicides of this type which may be characterized by the following formula:

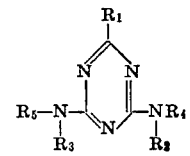

wherein $R_1$ is selected from the group consisting of chlorine, methoxy and methylthio;

$R_2$ and $R_3$ are each selected from the group consisting of hydrogen and ethyl; and $R_4$ and $R_5$ are each selected from the group consisting of ethyl and isopropyl.

Derivatives of this type include the following:
2-chloro-4,6-bis-(ethylamino)-s-triazine,
2-chloro-4,6-bis-(diethylamino-s-triazine,
2-chloro-4-ethylamino-6-(isopropylamino)-s-triazine,
2-chloro-4,6-bis-(isopropylamino)-s-triazine,
2-chloro-4,6-bis-(diisopropylamino)-s-triazine;
2-methoxy-4,6-bis-(ethylamino)-s-triazine,
2-methoxy-4,6-bis-(diethylamino)-s-triazine,
2-methoxy-4-ethylamino-6-(isopropylamino)-s-triazine,
2-methoxy-4,6-bis-(isopropylamino)-s-triazine,
2-methoxy-4,6-bis-(diisopropylamino)-s-triazine,
2-methylthio-4,6-bis-(ethylamino)-s-triazine,
2-methylthio-4,6-bis-(diethylamino)-s-triazine,
2-methylthio-4-ethylamino-6-(isoprpylamino)-s-triazine,
2-methylthio-4,6-bis-(isopropylamino)-s-triazine,
2-methylthio-4,6-bis-(diisopropylamino)-s-triazine.

EXPERIMENT 19

Experimental method and evaluation: same as in 17.

| Active substance | Concentration, mg./dish | Perennial agropyron | Annuals | | |
|---|---|---|---|---|---|
| | | | Matricaria | Urtica | Cynoglossum |
| XXIII | 75 | 3 | 0 | 1 | 0–1 |
|       | 150 | 4 | 0–1 | 3 | 1–2 |
| G     | 40 | 1 | 2 | 2 | 4 |
|       | 80 | 2 | 3 | 2 | 4 |
| G+XXIII | 40+75 | 3–4 | 3–4 | 3 | 4–5 |
| XXIV  | 25 | 4 | 0 | — | 0 |
|       | 50 | 4–5 | 0.–1 | — | 2 |
| G     | 40 | 1 | 2 | — | 4 |
|       | 80 | 2 | 3 | — | 4–5 |
| G+XXIV | 40+25 | 4–5 | 4 | — | 5 |

Similar results where obtained when using 2,2,3-trichloropropionic acid or 2,2-dichlorobutyric acid instead of XXIII or XXIV.

This experiment shows that chlorinated fatty acids can effectively be used to control not only monocots but also dicots by combining them according to the invention with a fluorene derivative.

EXPERIMENT 20

Experimental method: young plants of Galeopsis spec. (two-node stage, 3 plants per pot of 9 cm. diameter) are sprayed with 5 ml. of the test preparations per pot from above. The active substances had been dissolved in acetone, then water had been added up to the desired dilution. 3 weeks after treatment, the state of the apex and the degree of proliferation of tissue at the sprout axil is evaluated (0=no findings, 3=very strong effect).

|  | Concentration, p.p.m. | |
|---|---|---|
|  | 200 | 400 |
| Active substance: |  |  |
| V | 1-2 | 2 |
| H | 1 | 2 |
| H+V, 1:1 | 2-3 | 3 |
| V | 1-2 | 2 |
| J | 1 | 1 |
| J+V, 1:1 | 2 | 2-3 |
| V | 1-2 | 2 |
| K | 2 | 2 |
| K+V, 1:3 | 2-3 | 3 |
| V | 1-2 | 2 |
| L | 1 | 1-2 |
| L+V, 1:3 | 2 | 2-3 |
| V | 1-2 | 2 |
| M | 2 | 2 |
| M+V, 1:9 | 3 | 3 |

The experiment shows that the sprayings with combination preparations of 2-ethylhexyl (2-methyl-4-chlorophenoxy)-acetate and various fluorene derivatives (H, J, K, L, M) exhibit stronger effects than those with preparations containing the single active substances in the same concentrations.

EXPERIMENT 21

Joxynil (3,5-diiodo-4-hydroxy - benzonitrile; XXVI) and related compounds are known to be effective selective herbicides. They can be used for the control of weeds in cereals. The promptness and intensity of the herbicidal effect, however, are largely dependent on the stages of development of the weeds to be controlled and on influences of temperature and light. In general, progressed stages of development with more than 4–6 true leaves cannot be controlled by these substances. Lower temperatures and smaller light intensities (cool, cloudy weather) decrease the herbicidal effect considerably which can be a cause for failures in practice.

With combination preparations of XXVI and fluorene-9-carboxylic acid derivatives according to the invention also older stages of development of the weeds can be controlled. The effect of such combinations is furthermore surprisingly largely independent of temperature and light.

Experimental method: Clay dishes (20 x 20 cm.) were sown with wheat in rows and with the following weeds broadcastedly: Sinapis arvensis, Galeopsis spec., Galium apraine, Stellaria media, Galinsoga parviflora and Solanum nigrum. After emergence of the plants, the dishes were sprayed from above 10 ml. per dish at different dates:

Date I.—Wheat: 3 leaves; weeds: between older cotyledonary stage and stage of 2 true leaves;

Date II.—Wheat: tillering stage; weeds: with 2 to 4 true leaves;

Date III.—Wheat: end of tillering stage; weeds: with 4 to 6 true leaves.

The dishes were put in the open at predominantly cloudy weather. Evalution 3 weeks after spraying (0=no findings, 5=weeds totally destroyed).

| Dosage, g./ha. | Evaluation | | |
|---|---|---|---|
|  | Date I | Date II | Date III |
| Active substance: |  |  |  |
| XXVI   125 | 3-4 | 3 | 1-2 |
| 250 | 5 | 4-5 | 2 |
| 500 | 5 | 5 | 3 |
| B   125 | 2-3 | 2 | 1-2 |
| 250 | 3 | 2-3 | 2 |
| 500 | 3 | 3 | 2-3 |
| B+XXVI   125+125 | 5 | 4-5 | 3-4 |
| 250+250 | 5 | 5 | 4 |

This experiment shows that (a) the herbicidal effect of XXVI decreases strongly with progression of the growth stage of the weeds, (b) the combination according to the invention exhibits a superior effect against the progressed weeds.

Furthermore, it could be seen from the experiment that the combinations showed a very good compatibility towards the wheat.

EXPERIMENT 22

Experimental method and evaluation: same as in Experiment 21. The treatment was performed at "date III"; thereafter, the treated dishes were partly exposed to full sun light, partly kept in the shadow for three weeks and then evaluated.

| Dosage, g./ha. | Evaluation | |
|---|---|---|
|  | Full light | Shadow |
| Active substance: |  |  |
| XXVI   125 | 2-3 | 1-2 |
| 250 | 3-4 | 2 |
| 500 | 5 | 2-3 |
| 1,000 | 5 | 3 |
| B   125 | 1 | 1 |
| 250 | 1-2 | 1-2 |
| 500 | 2.3 | 2 |
| 1,000 | 3 | 2-3 |
| B+XXVI   125+125 | 3 | 2-3 |
| 250+250 | 4 | 3-4 |
| 500+500 | 5 | 4 |

This experiment shows that (a) the herbicidal effect of XXVI decreases strongly when light conditions are unfavorable.

(b) the combination according to the invention exhibits a superior effect under unfavorable light conditions.

EXPERIMENT 23

Experimental method and evaluation: same as in Experiment 21. The treatment was performed at "date III," the treated dishes were kept in the shadow for four days and then evaluated.

|  | Dosage, g./ha. | Evaluation |
|---|---|---|
| Active substance: |  |  |
| XXVI | 250 | 0-1 |
|  | 500 | 1 |
|  | 1,000 | 2 |
| B+V+XXVI | 300+1,200+250 | 4-5 |

This experiment shows that the course of the herbicidal effect is highly accelerated and intensified by using a combination of the known herbicides V and XXVI with the fluorene derivative B.

EXPERIMENT 24

Seeds of wheat and barley are treated for six hours with aqueous emulsions of the compositions at the concentrations given below and then disseminated. The experiment is evaluated by measuring (a) the distance between the surface of the soil and the tip of the first leaf after 7 days, (b) the distance between the surface of the soil and the third node (from above) after 42 days.

| Active substance | Concentration, p.p.m. | Distance in millimeters | | |
|---|---|---|---|---|
| | | Wheat (a) | Barley (a) | Barley (b) |
| Controls | | 145.2 | 129.4 | 76.7 |
| XXVII | 1,000 | 117.9 | 121.5 | |
| D | 1,000 | 93.9 | 84.4 | |
| D+XXVII | 500+500 | 92.1 | 76.2 | |
| XXVII | 1,000 | 91.3 | 96.4 | |
| D | 1,000 | 93.9 | 84.4 | |
| D+XXVIII | 500+500 | 76.9 | 75.0 | |
| XXVII | 1,000 | 117.9 | | 64.2 |
| C | 100 | 88.1 | | 51.0 |
| C+XXVII | 50+500 | 81.0 | | 47.1 |
| XXVIII | 1,000 | 91.3 | | 59.4 |
| C | 100 | 88.1 | | 51.0 |
| C+XXVIII | 50+500 | 63.0 | | 47.7 |

The experiment shows the superior effect of the compositions according to the invention on monocots.

EXPERIMENT 25

Analogously to Experiment 1, the inhibition of growth and development of *Galium aparine* is tested. Evaluation: from 0 (normal development to 5 (complete inhibition of development).

| Active substance: | Concentration, p.p.m. | Effect |
|---|---|---|
| XXVII | 500 | 1 |
| | 1,000 | 3 |
| XXVIII | 500 | 1 |
| | 1,000 | 4 |
| D | 500 | 3 |
| | 1,000 | 4 |
| D+XXVII | 250+250 | 4 |
| | 500+500 | 5 |
| D+XXVIII | 250+250 | 4 |
| | 500+500 | 5 |

The experiment shows the superior effect of the compositions according to the invention on dicots as compared to the effects of the single active substances.

EXPERIMENT 26

A turfgrass area 20 x 120 feet was fertilized and irrigated one week before application of test compounds. Two species of grass dominated the area, namely, Kentucky bluegrass (*Poa pratensis*) and a mixture of narrow leaf fescues (*Festuca spp.*). The grass was 3–4 inches in height on the day of application. The area was laid out to accommodate adjacent plots of 5' x 20' in a single strip.

Applications were made with a $CO_2$ bicycle sprayer delivering at a rate of 50 gallons spray solution per acre. Three tenth of an inch of natural rain fell twelve hours after application. The area was clipped on week after application. Materials and rates were as follows:

| Material | Rate, lbs./acre | Spray solution |
|---|---|---|
| XVIII, 3 lbs./gal | 5 | 63 ml. to ½ gal. $H_2O$. |
| | 3 | 38 ml. to ½ gal. $H_2O$. |
| | 2 | 25 ml. to ½ gal. $H_2O$. |
| G, 12.5% by wt. emulsion concentrate | 4 | 152 ml. to ½ gal. $H_2O$. |
| | 2 | 76 ml. to ½ gal. $H_2O$. |
| | 1 | 38 ml. to ½ gal. $H_2O$. |
| XVIII+G, 1 lb./gal | 5=2 | 63 ml.+76 ml. to ½ gal. $H_2O$. |

Results:

| | Rate, lbs./acre | Percent regrowth control after clipping | | |
|---|---|---|---|---|
| | | I | II | Average |
| Material: XVIII | 5 | 75 | 90 | 82.5 |
| | 3 | 50 | 40 | 45 |
| | 2 | 10 | 10 | 10 |
| G | 4 | 70 | 60 | 65 |
| | 2 | 30 | 20 | 25 |
| XVIII+G | 5=2 | 95 | 98 | 96.5 |
| Check | | 0 | 0 | 0 |

Thus the most effective treatments were the combination of XVIII at 5 pounds and G at 2 pounds per acre.

EXAMPLES

The following non-limitative examples describe novel compositions which are prepared and used according to conventional methods. The figures given are parts by weight.

Emulsion concentrates (1)

| | Parts |
|---|---|
| 2-ethyl-hexyl (2-methyl-4-chloro-phenoxy)-acetate | 42 |
| n-Butyl 9-fluorenol-9-carboxylate | 10 |
| Solvent naphtha | 23 |
| Xylene | 20 |
| Emulsifier (mixture of nonylphenol polyglycol ether and calcium dodecylbenzenesulfonate) | 5 |

Instead of the 2-ethyl-hexyl (2-methyl-4-chloro-phenoxy)-acetate, one of the following esters of substituted phenoxyalkanoic acids conventionally used in weed control may be applied:

2-ethyl-hexyl α-(2-methyl-4-chloro-phenoxy)-propionate
2-ethyl-hexyl γ-(2-methyl-4-chloro-phenoxy)-butyrate
2-ethyl-hexyl (2,4-dichlorophenoxy)-acetate
2-ethyl-hexyl (2,4,5-trichlorophenoxy)-acetate.

Likewise, the corresponding n-butyl, n-amyl, n-hexyl, isohexyl, n-heptyl, n-octyl, n-nonyl, n-decyl, n-dodecyl, 2-n-butoxyethyl, and benzyl esters are to be used in emulsion concentrates of the composition given above.

(2)

| | Parts |
|---|---|
| 2-ethyl-hexyl (2-methyl-4-chloro-phenoxy)-acetate | 42 |
| n-Butyl 9-fluorenol-9-carboxylate | 3 |
| Solvent-naphtha | 50 |
| Emulsifier (polyoxyethylene-sorbitane ester+sodium alkylaryl sulfonate) | 5 |

(3)

| | Parts |
|---|---|
| 2-n-butoxyethyl - α - (4 - chloro-2-methyl-phenoxy)-propionate | 35 |
| n-Butyl - 9 - n - butoxy-fluorene-9-carboxylate (B.P. 230° C. at 12 mm./mg) | 10 |
| Nonyl phenol polyglycol ether | 10 |
| Petroleum | 45 |

(4)

| | Parts |
|---|---|
| Isopropyl 2,4-dichlorophenoxy-acetate | 42 |
| n-Propyl 9-chloro - fluorene - 9 - carboxylate (liquid, not distillable) | 10 |
| Solvent-naphtha | 43 |
| Emulsifier (as defined in (2)) | 5 |

(5)

| | Parts |
|---|---|
| 2-n-butoxyethyl 2,4-dichlorophenoxy-acetate | 25 |
| n-Butyl 9-fluorenol-9-carboxylate | 15 |
| Solvent-naphtha | 40 |
| Cyclohexanone | 15 |
| Emulsifier (as defined in (2)) | 5 |

(6)

| | Parts |
|---|---|
| 2-n-butoxyethyl-α-(4-chloro-2-methyl-phenoxy)-propionate | 30 |
| Isobutyl 9-fluorenol-9-carboxylate | 20 |
| Fatty alcohol-polyglycol ether | 15 |
| Acetone | 35 |

(7)

| | Parts |
|---|---|
| 2-ethyl-hexyl (2-methyl-4-chlorophenoxy)-acetate | 20 |
| n-Butyl 2,7-dichloro-9-fluorenol-9-carboxylate | 5 |
| Turkey red oil | 25 |
| Dimethyl formamide | 50 |

Instead of the combination of esters given above, the following combinations are used in such formulations:

| | Parts |
|---|---|
| n-Hexyl 2,4,5-trichlorophenoxyacetate | 20 |
| Methyl 9-fluorenol-9-carboxylate | 5 |
| 2-ethyl-hexyl (2,4-dichlorophenoxy)-acetate) | 20 |
| n-Propyl 9-fluorenol-9-carboxylate | 5 |
| 2-ethyl-hexyl α-(2,4-dichlorophenoxy)-propionate | 20 |
| Ethyl 9-fluorenol-9-carboxylate | 5 |
| 2-n-butoxyethyl (2,4-dichlorophenoxy)-acetate | 20 |
| Ethyl 2-chloro-9-fluorenol-9-carboxylate | 5 |
| n-Hexyl α-(2,4,5-trichlorophenoxy)-propionate | 20 |
| n-Butyl 2-chloro-9-fluorenol-9-carboxylate | 5 |
| 2-ethyl-hexyl γ-(2-methyl-4-chlorophenoxy)-butyrate | 20 |
| Methyl 2-chloro-9-fluorenol-9-carboxylate | 5 |
| 2-n-butoxyethyl α-(2,4-dichlorophenoxy)-propionate | 20 |
| Methyl 2,7-dichloro-9-fluorenol-9-carboxylate | 5 |
| 2-ethyl-hexyl γ-(2,4-dichlorophenoxy)-butyrate | 20 |
| Methyl 2,7-dibromo-9-fluorenol-9-carboxylate | 5 |

Salt mixtures

(8)

| | Parts |
|---|---|
| Sodium 2,4-dichlorophenoxyacetate | 80 |
| Sodium 9-fluorenol-9-carboxylate | 19 |
| Sodium dialkylnaphthalene sulfonate | 1 |

(9)

| | Parts |
|---|---|
| Sodium 2-methyl-4-chlorophenoxyacetate | 75 |
| Ammonium 9-fluorenol-9-carboxylate | 20 |
| Silicic acid | 4 |
| Nonylphenol polyglycol ether | 1 |

(10)

| | Parts |
|---|---|
| Sodium γ-(2,4-dichlorophenoxy)-butyrate | 70 |
| Sodium 9-fluorenol-9-carboxylate | 29 |
| Sodium lauryl sulfate | 1 |

(11)

| | Parts |
|---|---|
| Sodium salt of 3,5-diiodo-4-hydroxybenzonitrile | 40 |
| Sodium 2-chloro-9-fluorenol-9-carboxylate | 59 |
| Sodium dialkylnaphthalene sulfonate | 1 |

(12)

| | Parts |
|---|---|
| Sodium a-(2,4,5-trichlorophenoxy)-propionate | 75 |
| Sodium 2-chloro-9-fluorenol-9-carboxylate | 25 |

(13)

| | Parts |
|---|---|
| Sodium γ-(2-methyl-4-chlorophenoxy)-butyrate | 90 |
| Sodium 2-bromo-9-fluorenol-9-carboxylate | 10 |

(14)

| | Parts |
|---|---|
| Sodium 2,4-dichlorophenoxyacetate | 50 |
| Sodium 2,7-dichloro-9-fluorenol-9-carboxylate | 50 |

(15)

| | Parts |
|---|---|
| Sodium γ-(2-methyl-4-chlorophenoxy)-butyrate | 70 |
| Sodium 2,7-dichloro-9-fluorenol-9-carboxylate | 30 |

Solutions of salts

(16)

| | Parts |
|---|---|
| Sodium 2-methyl-4-chloro-phenoxy-acetate | 20 |
| Sodium 2-chloro-9-fluorenol-9-carboxylate | 2 |
| Water | 78 |

(17)

| | Parts |
|---|---|
| Sodium 2,4-dichloro-phenoxy-acetate | 10 |
| Sodium 2,7-dibromo-9-fluorenol-9-carboxylate | 2 |
| Water | 88 |

(18)

| | Parts |
|---|---|
| Sodium α-(4-chloro-2-methyl-phenoxy)-propionate | 40 |
| Sodium 9-fluorenol-9-carboxylate | 10 |
| Water | 50 |

(19)

| | Parts |
|---|---|
| 1,1'-dimethyl-4,4'-dipyridylium dichloride | 15 |
| Sodium 2-chloro-9-fluorenol-9-carboxylate | 15 |
| Water | 70 |

Wettable powders

(20)

| | Parts |
|---|---|
| Methyl 2,4,5-trichloro-phenoxy-acetate | 25 |
| Methyl 9-acetoxy-fluorene-9-carboxylate | 25 |
| Sulfite waste liquor powder | 15 |
| Sodium alkylnapthalene sulfonate | 0.5 |
| Bole | 34.5 |

(21)

| | Parts |
|---|---|
| Methyl 2,4-dichlorophenoxypropionate | 20 |
| n-Butyl 2,7,9-trichlorofluorene-9-carboxylate | 4 |
| Oleic acid-N-methyl tauride | 8 |
| Bentonite | 68 |

(22)

| | Parts |
|---|---|
| Maleic acid hydrazide | 20 |
| Methyl 2-chloro-9-fluorenol-9-carboxylate | 40 |
| Sulfite waste liquor powder | 15 |
| Sodium alkylnaphthalene sulfonate | 0.5 |
| Bole | 24.5 |

(23)

| | Parts |
|---|---|
| 2-chloro-4,6-bis-(ethylamino)-triazine | 30 |
| Etyl 2,7-dibromo-9-acetoxy-fluorene-9-carboxylate | 3 |
| Sulfite waste liquor powder | 20 |
| Sodium alkylnaphthalene sulfonate | 0.5 |
| Bole | 26.5 |
| Talc | 20 |

(24)

| | Parts |
|---|---|
| 2-chloro-4,6-bis(ethylamino)-triazine | 30 |
| n-Butyl 9-fluorenol-9-carboxylate | 3 |
| Sulfite waste liquor powder | 20 |
| Sodium alkylnaphthalene sulfonate | 0.5 |
| Silicic acid | 3 |
| Bole | 26.5 |
| Talc | 17 |

(25)

| | Parts |
|---|---|
| 2-chloro-4,6-bis-(isopropylamino)-triazine | 30 |
| Sodium 9-fluorenol-9-carboxylate | 3 |
| Sulfite waste liquor powder | 20 |
| Sodium alkylnaphthalene sulfonate | 0.5 |
| Silicic acid | 3 |
| Bole | 26.5 |
| Talc | 17 |

(26)

| | Parts |
|---|---|
| γ(2-methyl-4-chloro-phenoxy)-butyric acid | 20 |
| Fluorene-9-carboxylic acid | 30 |
| Sulfite waste liquor powder | 19.5 |
| Sodium alkyl-naphthalene sulfonate | 0.5 |
| Kaolin | 30 |

(27)

| | Parts |
|---|---|
| 2-ethyl-hexyl (2-methyl-4-chlorophenoxy)-acetate | 20 |
| Methyl 2-chloro-9-fluorenol-9-carboxylate | 30 |
| Attaclay | 30 |
| Sulfite waste liquor powder | 15 |
| Sodium alkylnaphthalene sulfonate | 0.5 |
| Bole | 4.5 |

Instead of the methyl ester, any of the following esters of 2-chloro-9-fluorenol-9-carboxylic acid can be used:

Ethyl ester  n-Butyl ester
Isopropyl ester  Isobutyl ester
n-Propyl ester (28)

| | Parts |
|---|---|
| N - methyl - N - methoxy - N′ -(3,4-dichlorophenyl)-urea | 20 |
| n-Butyl 9-fluorenol-9-carboxylate | 30 |
| Attaclay | 30 |
| Sulfite waste liquor powder | 15 |
| Sodium alkylnaphthalene sulfonate | 0.5 |
| Silicic acid | 4.5 |

Ternary composition (emulsion concentrate)

(29)

| | Parts |
|---|---|
| Oleylamine salt of 3,5-diiode-4-hydroxybenzonitrile | 5 |
| 2-ethyl-hexyl (2-methyl-4-chlorophenoxy)-acetate | 20 |
| n-Butyl 9-fluorenol-9-carboxylate | 5 |
| Dimethyl formamide | 10 |
| Emulsifier (as defined in 2) | 5 |
| Xylene | 55 |

The following examples refer to preferred embodiments of processes to produce the novel compounds of this invention. It is to be understood, however, that all of the examples are merely illustrative, and not limitative of the remainder of the specification and claims in any way whatsoever.

(A) 22.6 g. 9-fluorenol-9-carboxylic acid are dissolved in 100 ml. n-propanol. After addition of 5 g. 96% sulfuric acid, the mixture is refluxed for 4 hours. The excess of the alcohol is distilled off and the residue is poured into water. An oil precipitates which is taken up in dichloromethane. The solution is washed with sodium hydrogen carbonate solution and with water and dried over sodium sulfate. The solvent is removed and the residue is recrystallized from ethanol. The pure n-propyl 9-fluorenol-9-carboxylate melts at 107–108° C.

Analogously, the following esters of 9-fluorenol-9-carboxylic acid can be prepared:

Isopropylester, M.P. 138–139° C.
Isobutyl ester, B.P. 242° C. at 12 mm. Hg
Tertiary butyl ester, M.P. 85–88° C.

(B) 22.6 g. 9-fluorenol-9-carboxylic acid and 200 ml. n-heptanol are kept at 100° C. while a slow stream of hydrogen chloride is introduced into the mixture. After 4 hours, the excess of the alcohol is removed in vacuum, the residue is dissolved in petroleum ether (B.P. 60–80° C.), the solution is filtered, the solvent removed and the resulting n-heptyl 9-fluorenol-9-carboxylate is distilled. B.P. 252–254° C. at 12 mm. Hg.

Analogously, n-dodecyl 9-fluorenol-9-carboxylate (B.P. 222–224° C. at 0.03 mm. Hg) can be prepared.

(C) 22.6 g. 9-fluorenol-9-carboxylic acid are suspended in 150 ml. water at 52° C. Within 2.5 hours, 7.1 g. chlorine gas is introduced into this suspension with stirring. After one additional hour of stirring, the 2-chloro-9-fluorenol-9-carboxylic acid is filtered, boiled with water and recrystallized from glacial acetic acid; M.P. 203–204° C.

Analogously to Example (A), the acid can be esterified whereupon the following esters are obtained:

Methyl ester, M.P. 141–143° C.
Ethyl ester, M.P. 143–147° C.
Isopropyl ester, M.P. 114–118° C.
n-Propyl ester, M.P. 98–104° C.
n-Butyl ester, M.P. 74–75° C.
Isobutyl ester, M.P. 54–58° C.

(D) 22.6 g. n-fluorenol-9-carboxylic acid are suspended in 100 ml. thionyl chloride. After addition of 1 ml. dimethyl formamide, the mixture is stirred until no more gas is developed and a clear solution has been obtained. The excess of the thionyl chloride is distilled off, the residue is dissolved in 100 ml. isopropanol, refluxed for 0.5 hour and cooled. The precipitated isopropyl 9-chloro-fluorene-9-carboxylate is filtered off M.P. 85° C.

Analogously, n-propyl 9-chlorofluorene-9-carboxylate (liquid, not distillable) is prepared.

(E) 22.6 g. n-fluorenol-9-carboxylic acid is suspended in 300 ml. water. 15 ml. bromine are added and the mixture is stirred for 3 hours at 50° C. The crystals are filtered and recrystallized from glacial acetic acid. 27 g. 2,7-dibromo-9-fluorenol-9-carboxylic acid of M.P. 252° C. are thus obtained.

Analogously to Example (A), the acid is transformed by reaction with n-butanol into n-butyl 2,7-dibromo-9-fluorenol-9-carboxylate of M.P. 116° C., and by reaction with the corresponding alcohols, the following esters are obtained:

Methyl ester  n-Propyl ester
Ethyl ester  Isobutyl ester
Isopropyl ester (F) 15 g. chlorine is introduced into a suspension of 22.6 g. 9-fluorenol-9-carboxylic acid in 150 ml. water within 6 hours with stirring. By filtering, 24 g. 2,7-dichloro-9-fluorenol-9-carboxylic acid of M.P. 229° C. are obtained.

By reaction with thionyl chloride, followed by treatment with n-butanol analogously to Example (D), the acid is transformed into n-butyl 2,7,9-trichloro-fluorene-9-carboxylate of M.P. 114.5° C.

(G) 29.6 g. 2,7-dichloro-9-fluorenol-9-carboxylic acid and 400 ml. n-butanol are refluxed for 4 hours while dry hydrogen chloride is passed into the mixture. The excess of the alcohol is removed in vacuum and the residue is recrystallized from cyclohexane. n-Butyl 2,7-dichloro-9-fluorenol-9-carboxylate of M.P. 109° C. is thus obtained.

The most important novel fluorene compounds may be characterized by the following formula:

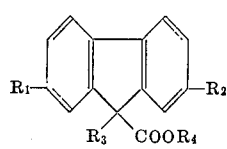

wherein $R_1$ and $R_2$ are each selected from the group consisting of hydrogen and halogen;

$R_3$ is a member of the group consisting of hydrogen, hydroxy, chlorine, acetoxy and alkoxy of up to 4 carbon atoms; and $R_4$ is selected from the group consisting of hydrogen, alkyl of up to 12 carbon atoms, and one equivalent of a salt forming cation, with the following exceptions:

(a) when $R_1$ and $R_2$ designate hydrogen and $R_3$ is hydroxy, $R_4$ represents a member of the group consisting of n-propyl, isopropyl, isobutyl, tert.- butyl, n-amyl, iso-amyl, n-heptyl, and dodecyl, and (b) when $R_1$ and $R_2$ designate hydrogen and $R_3$ is chlorine, $R_4$ represents alkyl of 3–12 carbon atoms.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Composition for controlling undesirable plant growth said composition comprising as the active ingredients in combination in a proportion by weight of 1:50 to 1:1 at least one fluorene derivative of the formula

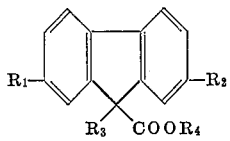

wherein $R_1$ and $R_2$ are each selected from the group consisting of hydrogen and halogen;

$R_3$ is a member of the group consisting of hydrogen, hydroxy, chlorine, acetoxy and alkoxy of up to 4 carbon atoms; and $R_4$ is a member of the group consisting of hydrogen, alkyl of up to 12 carbon atoms, and one equivalent of a salt forming cation, together with at least one compound known to be useful in plant treatment and selected from the group consisting of a phenoxy-alkane carboxylic acid derivative; giberellin; maleic acid hydrazide; an s-triazine; an amino triazole; a quaternary ammonium salt; a lower alkyl N-phenyl-carbamate and a substituted phenyl urea; a halo lower alkyl carboxylic acid; and a halogeno hydroxy benzonitrile, said active ingredients being present in a sufficient concentration to control undesirable plant growth.

2. Composition according to claim 1 wherein the fluorene derivative is a compound of the formula

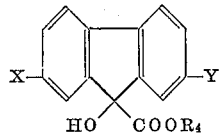

wherein

X and Y are each selected from the group consisting of hydrogen and chlorine; and $R_4$ is selected from the group consisting of hydrogen, alkyl of up to 8 carbon atoms, and one equivalent of a salt forming cation.

3. Composition according to claim 1 wherein the fluorene derivative is a compound of the formula

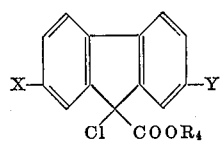

wherein

X and Y are each selected from the group consisting of hydrogen and chlorine; and $R_4$ is selected from the group consisting of hydrogen, alkyl of up to 8 carbon atoms, and one equivalent of a salt forming cation.

4. Composition according to claim 1 wherein the compound known to be useful in plant treatment is a compound of the formula

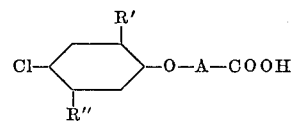

wherein

R' is selected from the group consisting of chlorine and methyl;

R" is selected from the group consisting of hydrogen and chlorine; and

A is selected from the group consisting of an alkylene group of 1 to 3 carbon atoms or a salt or ester thereof.

5. Composition according to claim 1 wherein the phenoxy-alkane carboxylic acid derivative is a member of the group consisting of 2,4-dichloro-phenoxy acetic acid
2-methyl-4-chloro-phenoxyacetic acid
2,4,5-trichloro-phenoxy acetic acid
α-2,4-dichloro-phenoxy propionic acid
α-2-methyl-4-chloro-phenoxy propionic acid
α-2,4,5-trichloro-phenoxy propionic acid
γ-2,4-dichloro-phenoxy butyric acid
γ-2-methyl-4-chloro-phenoxy butyric acid
γ-2,4,5-trichloro-phenoxy butyric acid and a salt and alkyl esters thereof.

6. Composition according to claim 1 wherein the phenoxy alkane carboxylic acid derivative is a member of the group consisting of 2-methyl-4-chloro-phenoxy-acetic acid
sodium 2-methyl-4-chloro-phenoxy-acetate
potassium 2-methyl-4-chlorophenoxy-acetate
dimethyl ammonium 2-methyl-4-chloro-phenoxy-acetate
2-ethylhexyl-(2-methyl-4-chloro-phenoxy)-acetate
α-(2-methyl-4-chloro-phenoxy)-propionic acid
α-2-n-butoxyethyl-α,β-(2-methyl-4-chloro phenoxy)-propionate
sodium 2,4-dichloro-phenoxy-acetate
dimethyl ammonium 2,4-dichloro-phenoxy-acetate
n-hexyl 2,4,5-trichloro-phenoxy-acetate
2,4-dichloro-phenoxy-acetic acid
γ-(2-methyl-4-chlorophenoxy)-butyric acid
2-ethylhexyl (2,4-dichlorophenoxy)-acetate.

7. Composition according to claim 1 wherein the s-triazine derivative is a compound of the formula

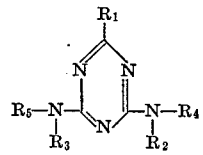

wherein $R_1$ is selected from the group consisting of chlorine, methoxy and methylthio;

$R_2$ and $R_3$ are each selected from the group consisting of hydrogen and ethyl; and $R_4$ and $R_5$ are each selected from the group consisting of ethyl and isopropyl.

8. Composition according to claim 1 wherein the triazine derivative is a member of the group consisting of 2-chloro-4,6-bis-(ethylamino)-s-triazine
2-chloro-4,6-bis-(diethylamino)-s-triazine
2-chloro-4-ethylamino-6-(isopropylamino)-s-triazine
2-chloro-4,6-bis-(isopropylamino)-s-triazine
2-chloro-4,6-bis-(diisopropylamino)-s-triazine
2-chloro-4,6-bis-(ethylamino)-s-triazine
2-methoxy-4,6-bis-(diethylamino)-s-triazine 2-methoxy-4-ethylamino-6-(isopropylamino)-s-triazine
2-methoxy-4,6-bis-(isopropylamino)-s-triazine
2-methoxy-4,6-bis-(diisopropylamino)-s-triazine
2-methylthio-4,6-bis-(ethylamino)-s-triazine
2-methylthio-4,6-bis-(diethylamino)-s-triazine
2-methylthio-4-ethylamino-6-(isopropylamino)-s-triazine
2-methylthio-4,6-bis-(isopropylamino)-s-triazine
2-methylthio-4,6-bis-(diisopropylamino)-s-triazine.

9. Composition according to claim 1 wherein the amine triazole derivative is 3-amino-1,2,4-triazole.

10. Composition according to claim 1 wherein the quaternary ammonium salt is selected from the group consisting of
(2-chloroethyl)-trimethyl ammonium chloride
(4-hydroxy-5-isopropyl-2-methylphenyl)-trimethyl-ammonium chloride
[5-isopropyl-2-methyl-4-(piperidino-carbonyloxy)-phenyl]trimethylammonium chloride
1,1'-ethylene-2,2'-dipyridylium-dibromide
1,1'-dimethyl-4,4'-dipyridylium-dichloride
1,1'-dimethyl-4,4'-dipyridylium-di-(methylsulfate).

11. Composition according to claim 1 wherein said one compound is selected from the group consisting of
isopropyl-N-phenyl-carbamate
isopropyl-N-(3-chlorophenyl)-carbamate
4-chloro-2-butinyl-N-(3-chlorophenyl)-carbamate
3-(p-chlorophenyl)-1,1-dimethyl urea
3-phenyl-1,1-dimethyl urea
3-(3,4-dichlorophenyl)-1,1-dimethyl urea
1-n-butyl-3-(3,4-dichlorophenyl)-1-methyl urea
3-(3,4-dichlorophenyl)-1-methoxy urea
3-(1-chlorophenyl)-1-methoxy urea
1-cyclooctayl-3,3-dimethyl urea
1,3-bis-(2,2,2-trichloro-1-hydroxyethyl)-urea.

12. Composition according to claim 1 wherein the halo-lower alkyl carboxylic acid is selected from the group consisting of trichloroacetic acid; 2,2-dichloropropionic acid; 2,2,3-trichloropropionic acid; and 2,2-dichlorobutyric acid.

13. A composition according to claim 1 wherein said compound known to be useful in plant treatment is maleic acid hydrazide.

14. A composition according to claim 1 wherein said compound known to be useful in plant treatment is 3,5-diiodo-4-hydroxy-benzonitrile.

15. A composition according to claim 1 wherein said fluorene derivative is n-butyl-9-fluorenol-9-carboxylate, and said compound known to be useful in plant treatment is 2-ethylhexyl-(2-methyl-4-chloro-phenoxy)-acetate.

16. A composition according to claim 1 wherein said fluorene derivative is methyl-2-chloro-9-fluorenol-9-carboxylate, and said compound known to be useful in plant treatment is maleic acid hydrazide.

17. A composition according to claim 1 wherein said fluorene derivative is butyl-9-butoxy-fluorene-9-carboxylate, and said compound known to be useful in plant treatment is butylglycol-4-chloro-2-methyl-phenoxy-propionate.

18. A method for controlling undesirable plant growth, which method comprises applying to a plant in an active state of growth an effective amount of a composition as defined by claim 1.

19. A method for controlling undesirable plant growth, which method comprises applying to a plant in an active state of growth an effective amount of a composition as defined by claim 2.

20. A method for controlling undesirable plant growth, which method comprises applying to a plant in an active state of growth an effective amount of a composition as defined by claim 3.

21. A method for controlling undesirable plant growth, which method comprises applying to a plant in an active state of growth an effective amount of a composition as defined by claim 4, and wherein said composition is applied at a rate of 0.1–30 pounds per acre.

22. A method for controlling undesirable plant growth, which method comprises applying to a plant in an active state of growth an effective amount of a composition as defined by claim 5.

23. A method for controlling undesirable plant growth, which method comprises applying to a plant in an active state of growth an effective amount of a composition as defined by claim 6, and wherein said composition is applied at a rate of 0.1–30 pounds per acre.

24. A method for controlling undesirable plant growth, which method comprises applying to a plant in an active state of growth an effective amount of a composition as defined by claim 7, and wherein said composition is applied at a rate of 0.1–30 pounds per acre.

25. A method for controlling undesirable plant growth, which method comprises applying to a plant in an active state of growth an effective amount of a composition as defined by claim 15, and wherein said composition is applied at a rate of 0.1–30 pounds per acre.

26. A method for controlling undesirable plant growth, which method comprises applying to a plant in an active state of growth an effective amount of a composition as defined by claim 16, and wherein said composition is applied at a rate of 0.1–30 pounds per acre.

27. A method as defined by claim 18 wherein said fluorene derivative is n-heptyl 2-chloro-9-fluorenol-9-carboxylate, and said compound known to be useful in plant treatment is 2-ethylhexyl 2,4-dichlorophenoxy-acetate, said composition being applied at a rate of 0.1–30 pounds per acre.

28. A method as defined by claim 18 wherein said fluorene derivative is 2-chloro-9-fluorenol-9-carboxylic acid, and said compound known to be useful in plant treatment is gibberellin A 3, said composition being applied at a rate of 0.1–30 pounds per acre.

29. A method as defined by claim 18 wherein said fluorene derivative is 2-chloro-9-fluorenol-9-carboxylic acid, and said compound known to be useful in plant treatment is maleic acid hydrazide, said composition being applied at a rate of 0.1–30 pounds per acre.

30. A method as defined by claim 18 wherein said fluorene derivative is methyl 2-chloro-9-fluorenol-9-carboxylate, and said compound known to be useful in plant treatment is maleic acid hydrazide, said composition being applied at a rate of 0.1–30 pounds per acre.

31. A method as defined by claim 18 wherein said fluorene derivative is 2-chloro-9-fluorenol-9-carboxylic acid, and said compound known to be useful in plant treatment is 3-amino-1,2,4-triazole, said composition being applied at a rate of 0.1–30 pounds per acre.

32. A method as defined by claim 18 wherein said fluorene derivative is 2-chloro-9-fluorenol-9-carboxylic acid, and said compound known to be useful in plant treatment is 1,1'-dimethyl-4,4'-bipyridilium-dichloride, said composition being applied at a rate of 0.1–30 pounds per acre.

33. A method as defined by claim 18 wherein said fluorene derivative is methyl 2-chloro-9-fluorenol-9-carboxylate, and said compound known to be useful in plant treatment is 2-ethylhexyl-(2-methyl-4-chloro-phenoxy) - acetate, said composition being applied at a rate of 0.1–30 pounds per acre.

34. A method as defined by claim 18 wherein said fluorene derivative is methyl 2-chloro-9-fluorenol-9-carboxylate, and said compound known to be useful in plant treatment is isopropyl N-(3-chloro-phenyl)-carbonate, said composition being applied at a rate of 0.1–30 pounds per acre.

35. A method as defined by claim 18 wherein said fluorene derivative is methyl 2-chloro-9-fluorenol-9-carboxylate, and said compound known to be useful in plant treatment is N-(4-chlorophenyl)-N,N'-dimethyl-urea, said composition being applied at a rate of 0.1–30 pounds per acre.

36. A method as defined by claim 18 wherein said fluorene derivative is methyl 2-chloro-9-fluorenol-9-carboxylate, and said compound known to be useful in plant treatment is 2-chloro-4,6-bis-(ethylamino)-triazine, said composition being applied at a rate of 0.1–30 pounds per acre.

37. A method as defined by claim 18 wherein said fluorene derivative is methyl 2-chloro-9-fluorenol-9-carboxylate, and said compound known to be useful in plant treatment is trichloroacetic acid, said composition being applied at a rate of 0.1–30 pounds per acre.

38. A method as defined by claim 18 wherein said fluorene derivative is methyl 2-chloro-9-fluorenol-9-carboxylate, and said compound known to be useful in plant treatment is 2,2-dichloropropionic acid, said composition being applied at a rate of 0.1–30 pounds per acre.

39. A method as defined by claim 18 wherein said fluorene derivative is n-butyl 9-fluorenol-9-carboxylate, and said compound known to be useful in plant treatment is 3,5-diiodo-4-hydroxy-benzonitrile, said composition being applied at a rate of 0.1–30 pounds per acre.

40. A method as defined by claim 18 wherein said fluorene derivative is 9-fluorenol-9-carboxylic acid, and said compound known to be useful in plant treatment is [5-isopropyl-2 - methyl - 4 - (piperidinocarbonyloxy)-phenyl]-trimethyl-ammonium chloride, said composition being applied at a rate of 0.1–30 pounds per acre.

41. A method as defined by claim 18 wherein said fluorene derivative is 9-fluorenol-9-carboxylic acid, and said compound known to be useful in plant treatment is 2-chloroethyltrimethylammonium cholride, said composition being applied at a rate of 0.1–30 pounds per acre.

42. A method as defined by claim 18 wherein said fluorene derivative is 2-chloro-9-fluorenol-9-carboxylic acid, and said compound known to be useful in plant treatment is [5-isopropyl-2-methyl-4-(piperidino - carbonyloxy)-phenyl]-trimethylammonium chloride, said composition being applied at a rate of 0.1–30 pounds per acre.

43. A method as defined by claim 18 wherein said fluorene derivative is 2-chloro-9-fluorenol-9-carboxylic acid, and said compound known to be useful in plant treatment is 2-chloroethyl-trimethylammonium chloride, said composition being applied at a rate of 0.1–30 pounds per acre.

44. A method as defined by claim 18 wherein said composition is applied in a concentration of 0.1–100,000 parts by weight per million parts of carrier.

45. A composition as defined by claim 1, wherein said composition comprises 0.1–100,000 parts by million on a weight basis of the active ingredient.

References Cited

UNITED STATES PATENTS 3,235,358  2/1966  Soboczenski _____ 71—92

OTHER REFERENCES

Plant Regulators, CBCC, Positive Data Series No. 2, June 1955.

JAMES O. THOMAS, JR., Primary Examiner

U.S. Cl. X.R.

71—92, 93, 94, 105, 106, 107, 108, 109, 110, 111, 114, 116, 117, 119, 120

UNITED STATES PATENT OFFICE
CERTIFICATE OF CORRECTION

Patent No. 3,506,434              Dated April 14, 1970

Inventor(s) Ernst Jacobi, Dietrich Erdmann, Gunther Mohr, Sigmund Lust, Gerhart Schneider and Konrad Niethammer It is certified that error appears in the above-identified patent and that said Letters Patent are hereby corrected as shown below:

Claim 8, line 74, should read --2-methoxy-4,6-bis-(ethylamino)-s-triazine--.

Claim 11, line 34, should read --1-cyclooctyl-3,3-dimethyl urea;

Claim 34, line 67, "carbonate" should read --carbamate--.

SIGNED AND SEALED

SEP 29 1970

(SEAL)
Attest:

Edward M. Fletcher, Jr.
Attesting Officer

WILLIAM E. SCHUYLER, JR.
Commissioner of Patents